(12) United States Patent
Nakayamai

(10) Patent No.: US 8,013,897 B2
(45) Date of Patent: Sep. 6, 2011

(54) APPARATUS FOR CORRECTING CAMERA SHAKE AND IMAGE CAPTURING APPARATUS

(75) Inventor: Kenji Nakayamai, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 814 days.

(21) Appl. No.: 12/070,290

(22) Filed: Feb. 14, 2008

(65) Prior Publication Data

US 2009/0009634 A1     Jan. 8, 2009

(30) Foreign Application Priority Data

Feb. 27, 2007  (JP) ................ 2007-046477
Feb. 27, 2007  (JP) ................ 2007-046762

(51) Int. Cl.
*H04N 5/228* (2006.01)

(52) U.S. Cl. ............. 348/208.7; 348/208.99; 348/208.1; 348/208.2; 348/208.3; 348/208.4; 348/208.5; 348/208.6; 348/208.8; 348/208.11; 348/208.12; 348/208.13; 396/55

(58) Field of Classification Search ........................ None
See application file for complete search history.

(56) References Cited

U.S. PATENT DOCUMENTS

| | | | |
|---|---|---|---|
| 2006/0055787 A1* | 3/2006 | Hirota et al. ............. | 348/208.5 |
| 2007/0025710 A1 | 2/2007 | Shin et al. | |
| 2007/0284968 A1* | 12/2007 | Takeuchi ..................... | 310/332 |

FOREIGN PATENT DOCUMENTS

| | | | |
|---|---|---|---|
| JP | 11-235064 A | | 8/1999 |
| JP | 2005-168088 A | | 6/2005 |
| JP | 2006121769 A | * | 5/2006 |
| JP | 2006-145768 A | | 6/2006 |
| JP | 2006-171528 A | | 6/2006 |
| JP | 2006-172635 A | | 6/2006 |
| JP | 2007-28749 A | | 2/2007 |
| JP | 2007-037094 A | | 2/2007 |
| JP | 2007-047213 A | | 2/2007 |

OTHER PUBLICATIONS

Japanese Office Action (and English translation thereof) dated Dec. 2, 2008, issued in counterpart Japanese Application No. 2007-046762.

Japanese Office Action (and English translation thereof) dated Dec. 2, 2008, issued in counterpart Japanese Application No. 2007-046477.

* cited by examiner

*Primary Examiner* — Nicholas G Giles
*Assistant Examiner* — Yih-Sien Kao
(74) *Attorney, Agent, or Firm* — Holtz, Holtz, Goodman & Chick, PC

(57) ABSTRACT

A digital camera 100 is provided with an optical unit 1, CCD 3, a CCD holder 27 for holding CCD 3, actuator 10 for connecting the CCD holder 27 with the optical unit 1, wherein the actuator changes in shape when a voltage is applied across a front surface and rear surface thereof, and flexible printed circuits 8, 9 for applying voltages to driving members 10*a*, 10*b*, 10*c* and 10*d* in response to detection of camera shake to move the CCD holder 27 such that an optical axis Z of the optical unit 1 passes through the center of the image capturing plane 300 of CCD 3.

12 Claims, 31 Drawing Sheets

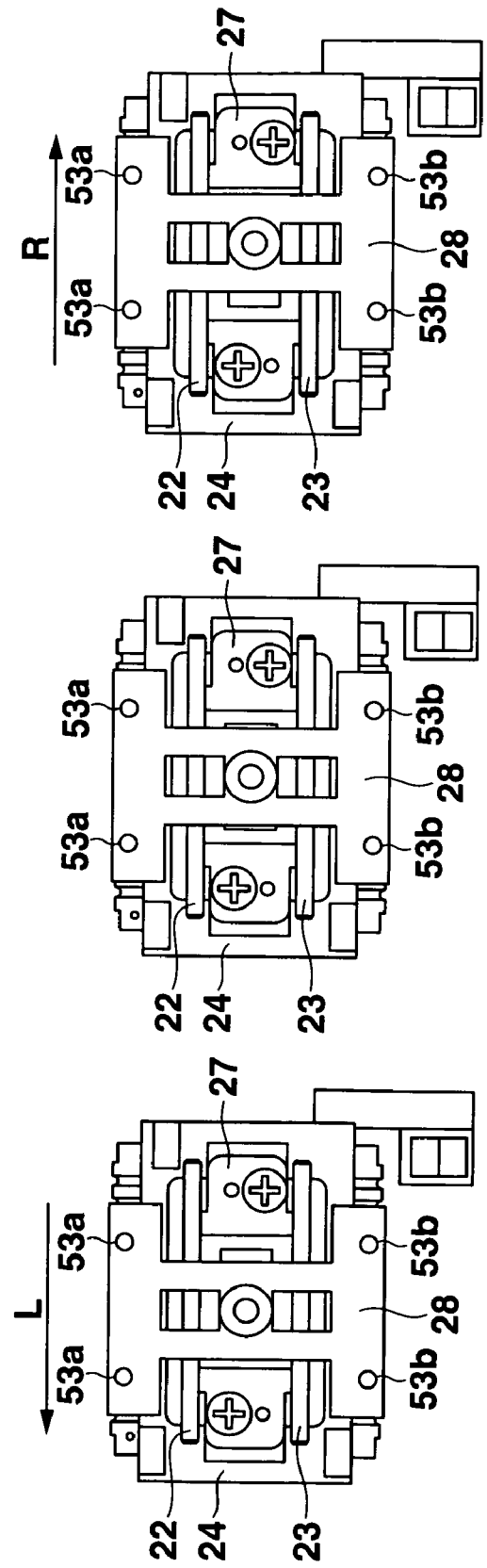

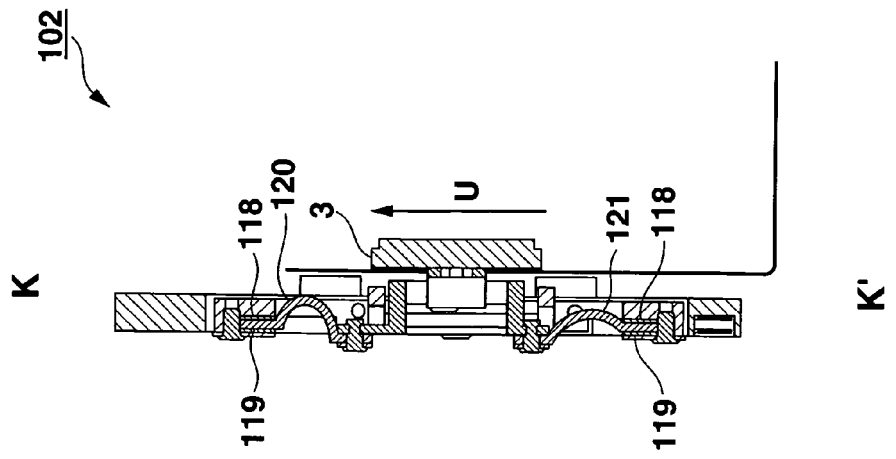
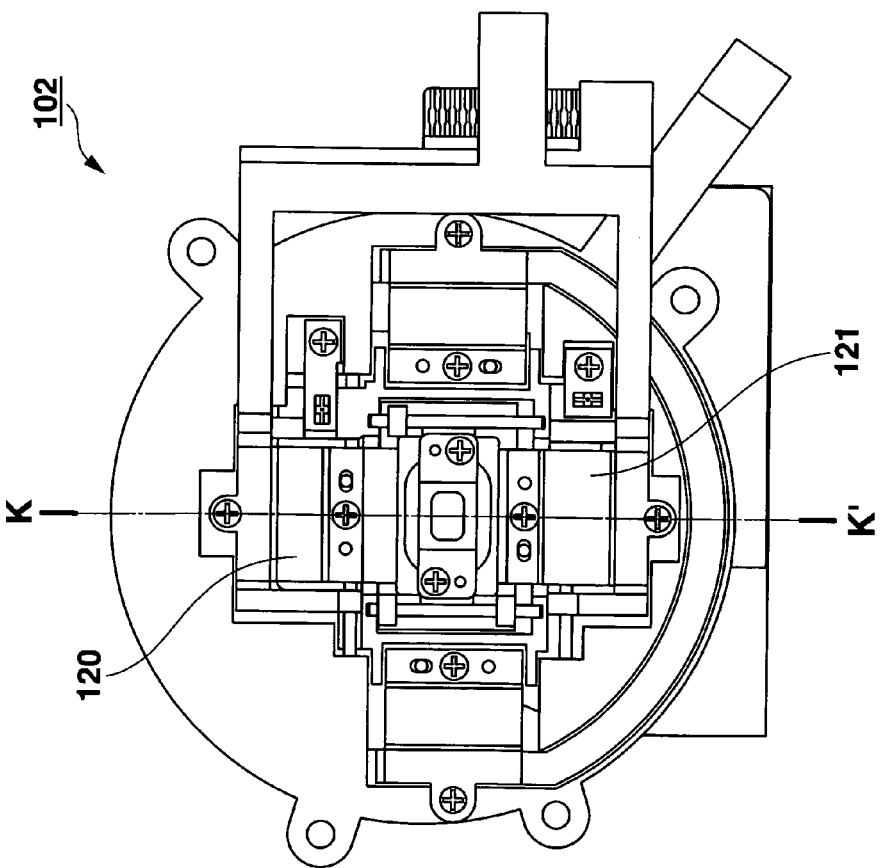

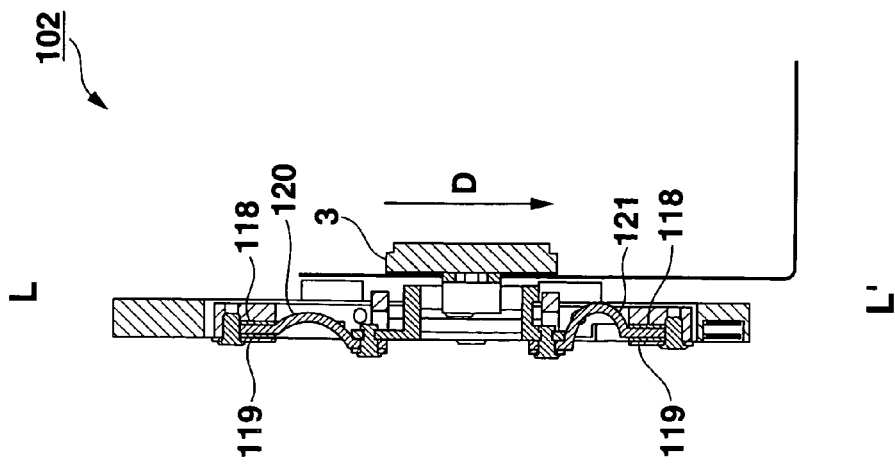
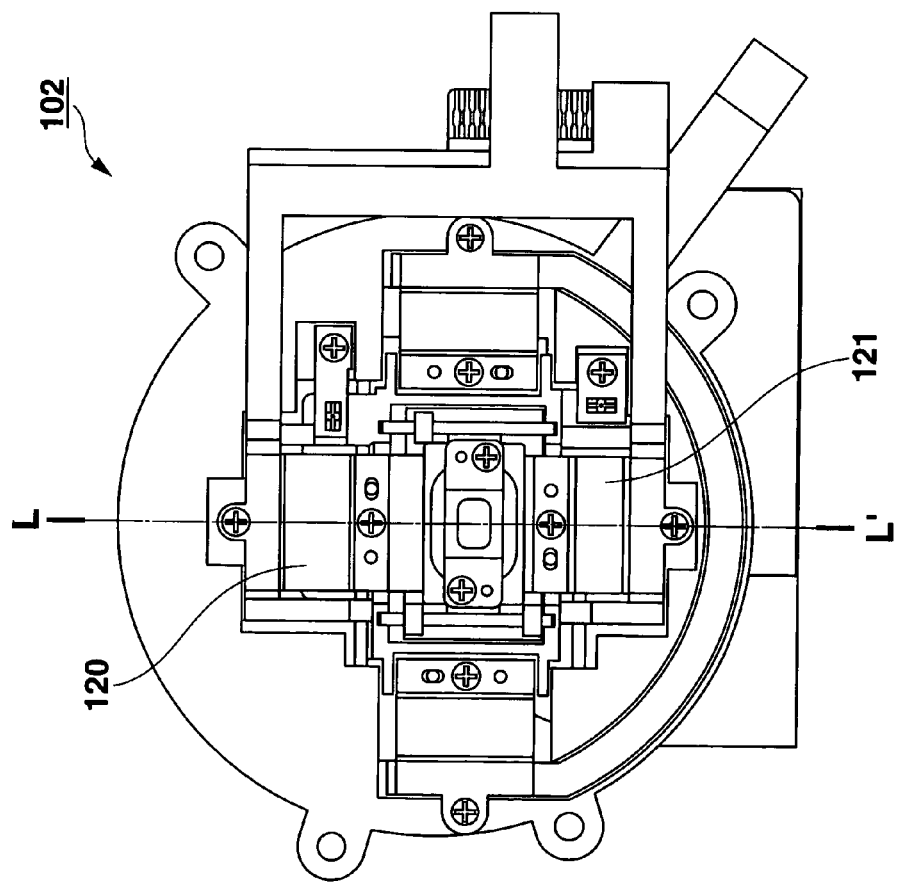
FIG. 27B
FIG. 27A

APPARATUS FOR CORRECTING CAMERA SHAKE AND IMAGE CAPTURING APPARATUS

BACKGROUND OF THE INVENTION

1. Field of the Invention

The present invention relates to an apparatus for correcting camera shake, which is applied to an image capturing apparatus, and further relates to an image capturing apparatus.

2. Description of the Related Art

Most of current image capturing apparatuses are provided with a camera shake correcting function for correcting camera shake.

As one of the camera shake correcting functions is known a mechanical correcting technique which uses actuators for moving an image sensor to cancel camera shake.

In recent, an elastic driving element of a film type (polymer actuator) has been developed, which changes in shape when a voltage is applied across a front surface and rear surface of the elastic driving element.

In general, an ion-conductive polymer film has a characteristic that when a voltage is applied across electrodes, which holds the ion-conductive polymer film between them, water within the polymer film moves from a positive electric potential side to a negative electric potential side together with positive ions, whereby the polymer film increases in length at its negative electric potential side, and on the contrary the polymer film decreases in length at its positive electric potential side. The polymer actuator utilizes the above described characteristic, and works as an actuator in the camera shake correcting apparatuses.

SUMMARY OF THE INVENTION

The present invention has an object to provide an apparatus for correcting camera shake and an image capturing apparatus, which use flexible driving elements such as polymer film actuators represented by ion-conductive polymer film actuators to correct camera shake with no backlash of gears.

According to one aspect of the invention, there is provided an apparatus for correcting camera shake, used in a camera that includes an optical unit and an image capturing element having an image capturing plane, which apparatus comprises a holding unit for holding the image capturing element, driving unit connected between the holding unit and the optical unit of the camera, wherein the driving unit changes in shape when a voltage is applied across a front surface and rear surface thereof, a detecting element for detecting camera shake of the camera, and voltage applying unit for applying voltage to the driving unit in response to detection by the detecting element to move the holding unit, thereby displacing the image capturing element such that an optical axis of the optical unit passes through the center of the image capturing plane of the image capturing element.

According to another aspect of the invention, there is provided an image capturing apparatus which comprises an optical unit including a lens, an image capturing element having an image capturing plane, holding unit for holding the image capturing element, driving unit connected between the holding unit and the optical unit, wherein the driving unit changes in shape when a voltage is applied across a front surface and rear surface thereof, a detecting element for detecting camera shake, and a voltage applying unit for applying voltage to the driving unit in response to detection by the detecting element to move the holding unit, thereby displacing the image capturing element such that an optical axis of the lens of the optical unit passes through the center of the image capturing plane of the image capturing element.

BRIEF DESCRIPTION OF THE DRAWINGS

FIG. 7A is a view showing an actuator holder, which has moved leftward as indicated by an arrow L.

FIG. 7B is a view showing an actuator holder, which stays at the center.

FIG. 7C is a view showing the actuator holder, which has moved rightward as indicated by an arrow R.

FIG. 26A is a rear view of the CCD stage unit in the second embodiment, which has moved upward, as seen in the drawing.

FIG. 26B is a cross sectional view of the CCD stage unit in the second embodiment, which has moved upward as indicated by an arrow U.

FIG. 27A is a rear view of a CCD stage unit in the second embodiment, which has moved downward, as seen in the drawing.

FIG. 27B is a cross sectional view of the CCD stage unit in the second embodiment, which has moved downward as indicated by an arrow D.

DETAILED DESCRIPTION OF THE PREFERRED EMBODIMENTS

Now, embodiments of an apparatus for correcting camera shake according to the present invention, which is used in an image capturing apparatus, will be described in detail.

First Embodiment

Figure 1A:
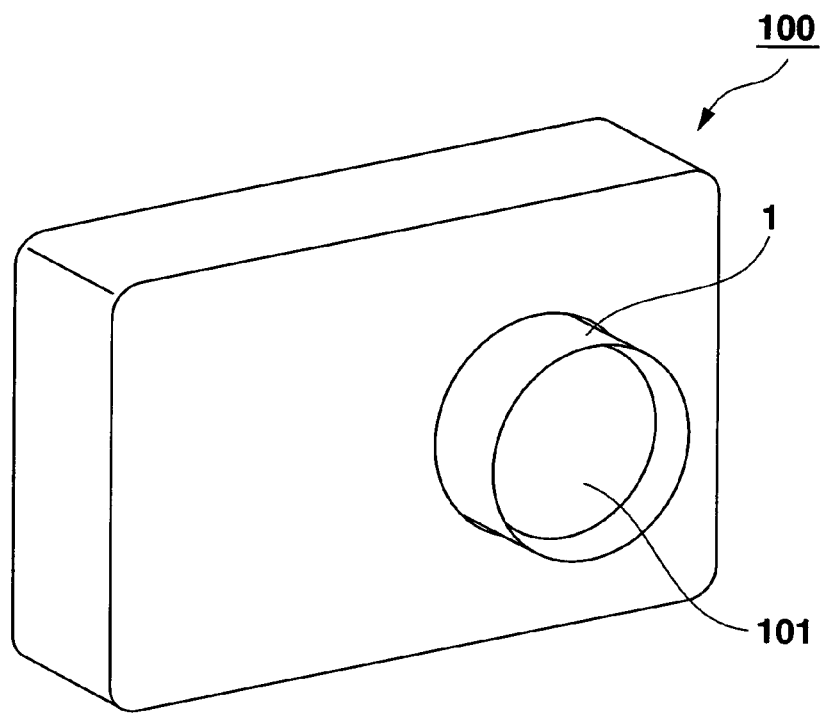
FIG. 1A is a perspective view of a digital camera, as seen from its front face.
Figure 1B:
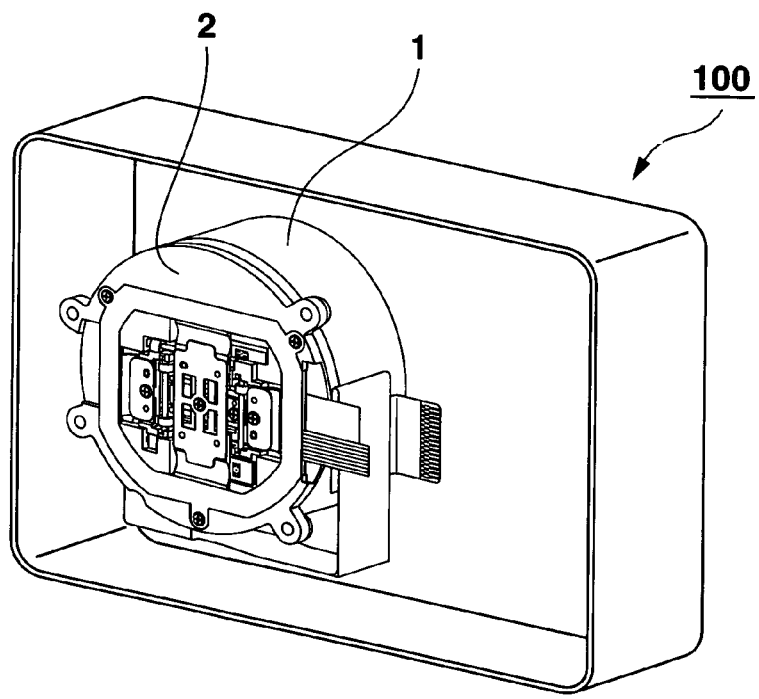
FIG. 1B is a perspective view of an inside of the digital camera, as seen from its rear side, and in particular, showing a lens unit in detail.

FIG. 1A is a perspective view showing a digital camera 100, as seen from the front face. FIG. 1B is a perspective view showing an inside of the digital camera 100, as viewed from its rear side.

Figure 2A:
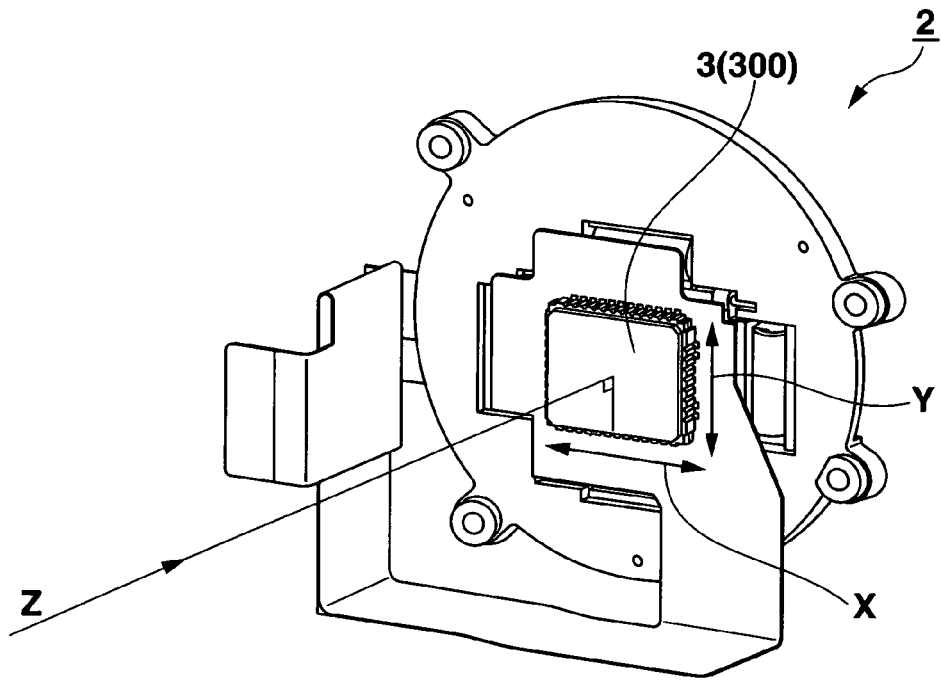
FIG. 2A is a perspective view of a CCD stage unit, as seen from its front side.
Figure 2B:
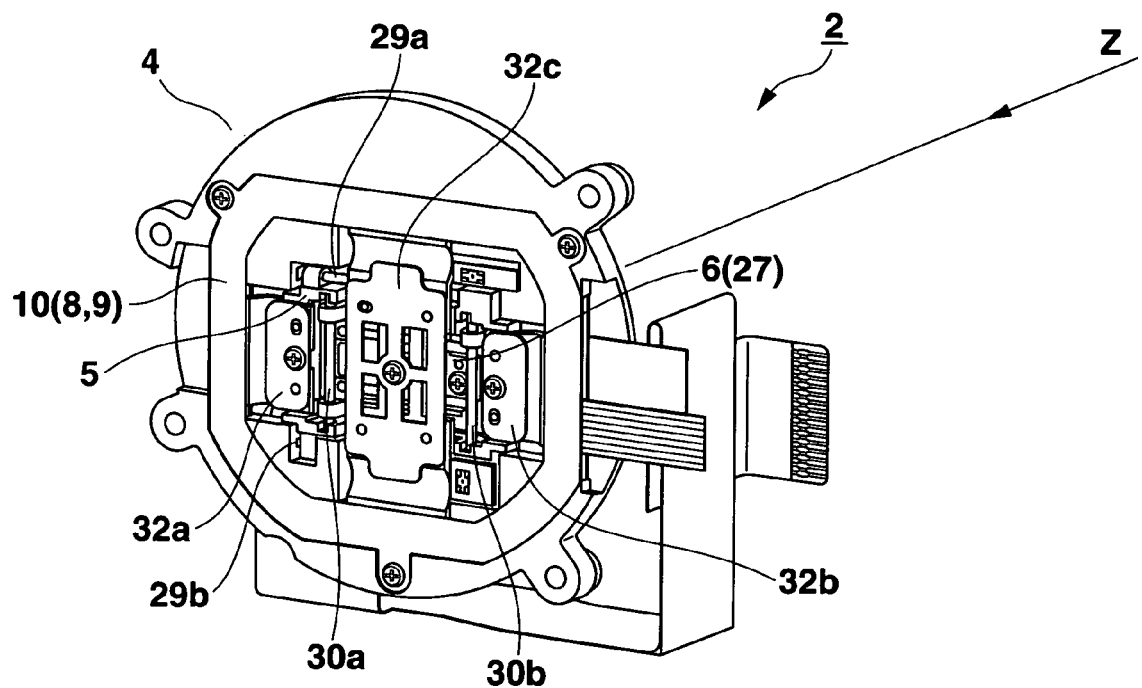
FIG. 2B is a perspective view of the CCD stage unit, as seen from its rear side.

FIG. 2A is a perspective view of a CCD stage unit 2, as viewed from its front side. FIG. 2B is a perspective view of the CCD stage unit 2, as viewed from its rear side.

As shown in FIGS. 1A and 1B, the digital camera 100 is provided with the CCD stage unit 2 and a lens unit 1 including an optical lens 101.

The CCD stage unit 2 is mounted on the lens unit 1, as shown in FIG. 1B.

Further, the CCD stage unit 2 is provided with CCD 3, as shown in FIG. 2A.

The CCD stage unit 2 is mounted on the lens unit 1 to secure that an imaging area or image capturing plane 300 of CCD 3 is arranged perpendicular to an optical axis Z of the lens unit 1 and also supported at the center of the lens unit 1.

A circuitry including a control unit, battery unit, media unit and sensor unit (not shown) is provided in the space on the right of the lens unit 1 as viewed in FIG. 1B.

As shown in FIG. 2B, the CCD stage unit 2 comprises a base unit 4, X stage unit 5, and Y stage unit 6, wherein the X stage unit 5 serves to move CCD 3 in the X-axis direction, and the Y stage unit 6 serves to move CCD 3 in the Y-axis direction.

Figure 3A:
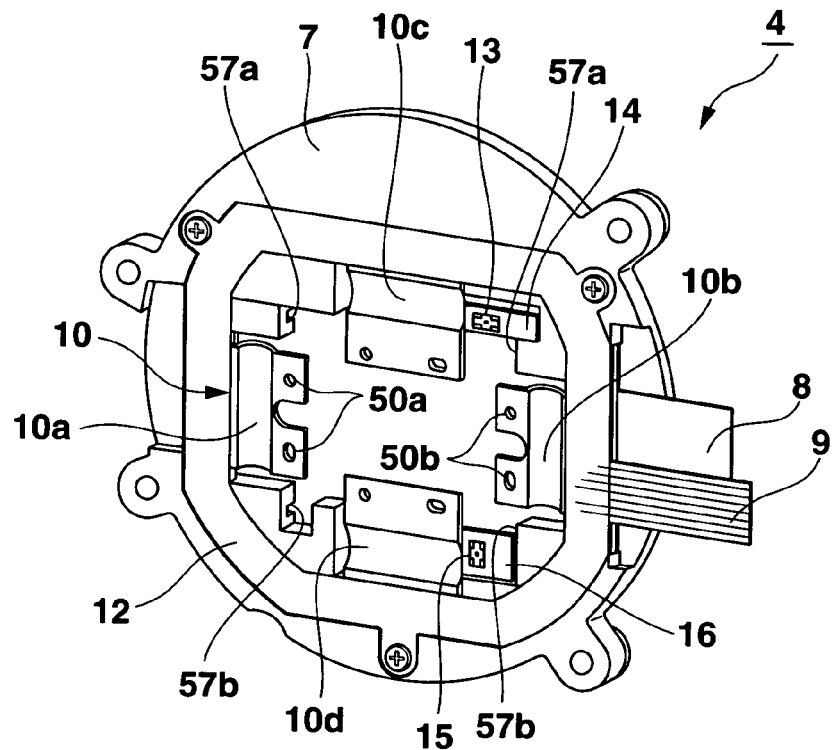
FIG. 3A is a perspective view of a base unit, as seen from its rear side.
Figure 3B:
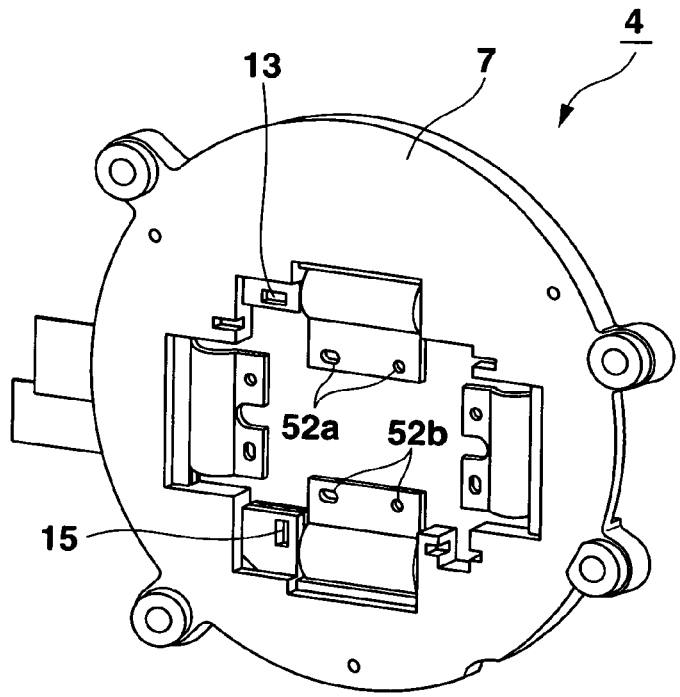
FIG. 3B is a perspective view of the base unit, as seen from its front side.

Further, as shown in FIGS. 3A and 3B, the base unit 4 comprises a base plate 7, actuator 10, FPCs (Flexible Printed Circuits) 8 and 9 for applying voltages from the circuitry (not shown) to the actuator 10 to drive the same, holding member 12 for holding FPCs 8, 9, hole sensor 13 for detecting a displacement in the X-axis direction, substrate 14 for holding the hole sensor 13, hole sensor 15 for detecting a displacement in the Y-axis direction, and substrate 16 for holding the hole sensor 15, wherein the actuator 10 is adapted to move CCD 3 in the X-axis direction with the aid of the X stage unit 5 and Y stage unit 6 having a CCD holder 27, and to move CCD 3 in the Y-axis direction with the aid of the Y stage unit 6.

The actuator 10, FPCs 8, 9, holding member 12, substrate 14, and substrate 16 are fixed on the base plate 7 by means of screws.

Meanwhile, the base plate 7 is fixed on the lens unit 1.

Figure 4:
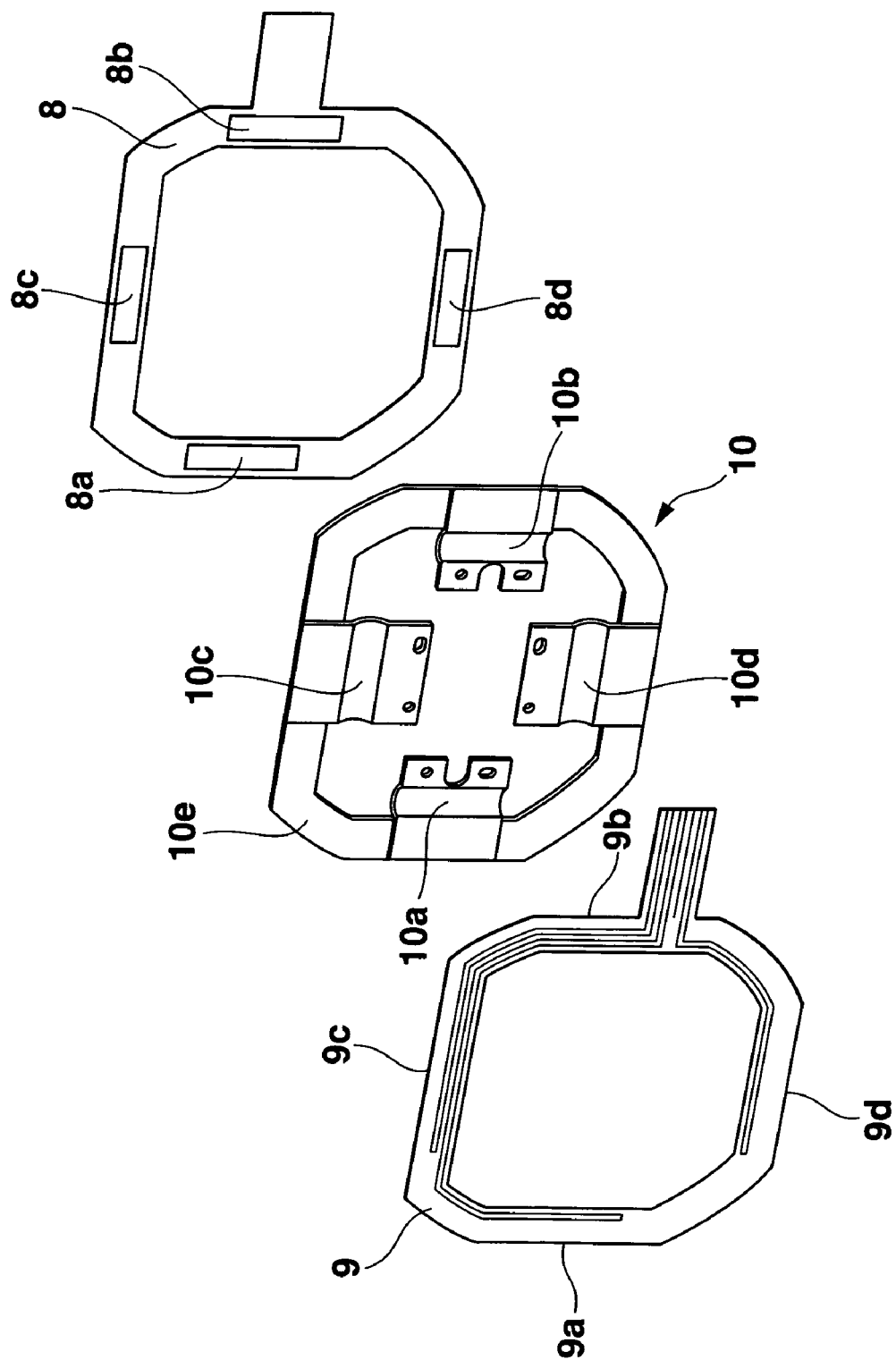
FIG. 4 is a view showing an actuator and FPCs (flexible printed circuits), as seen from the rear side.

As shown in FIG. 4, the actuator 10 consists of a frame 10e of an approximately rectangle shape and driving members 10a, 10b, 10c and 10d attached to the frame 10e. The driving members 10a, 10b, 10c and 10d are made of an Ionic Polymer-Metal Composite film.

The driving members 10a, 10b serve to move X stage unit 5 and Y stage unit 6, thereby displacing CCD 3 in the X-axis direction. In the meantime, the driving members 10c, 10d serve to move Y stage unit 6, thereby displacing CCD 3 in the Y-axis direction.

The driving members 10a, 10b, 10c and 10d are disposed on the frame 10e with approximately even intervals left between them.

One end portions of the driving members 10a, 10b, 10c and 10d are firmly fixed on the frame 10e and the other end portions thereof are arranged to project into an inner space defined and surrounded by the frame 10e.

FPC 8 and FPC 9 sandwich in the frame 10e between them and further are firmly held between the base plate 7 and the holding member 12.

As described above, the one end portions of the driving members 10a, 10b, 10c and 10d are firmly fixed on the base plate 7.

The driving members 10a, 10b, 10c and 10d are electrically separated from each other.

FPC 8 has electrodes 8a, 8b, 8c and 8d, which are electrically connected to the front surfaces (in the same side as CCD 3) of the driving members 10a, 10b, 10c and 10d, respectively.

When voltages are applied from the circuitry (not shown), an electric potential at the front surface of the driving member 10a, an electric potential at the front surface of the driving member 10b, an electric potential at the front surface of the driving member 10c and an electric potential at the front surface of the driving member 10d are controlled independently.

FPC 9 has electrodes 9a, 9b, 9c and 9d, which are electrically connected to rear surfaces (in the opposite side to CCD 3) of the driving members 10a, 10b, 10c and 10d of the actuator 10, respectively.

When voltages are applied from the circuitry (not shown), an electric potential at the rear surface of the driving member 10a, an electric potential at the rear surface of the driving member 10b, an electric potential at the rear surface of the driving member 10c and an electric potential at the rear surface of the driving member 10d are controlled independently.

Figure 5A:
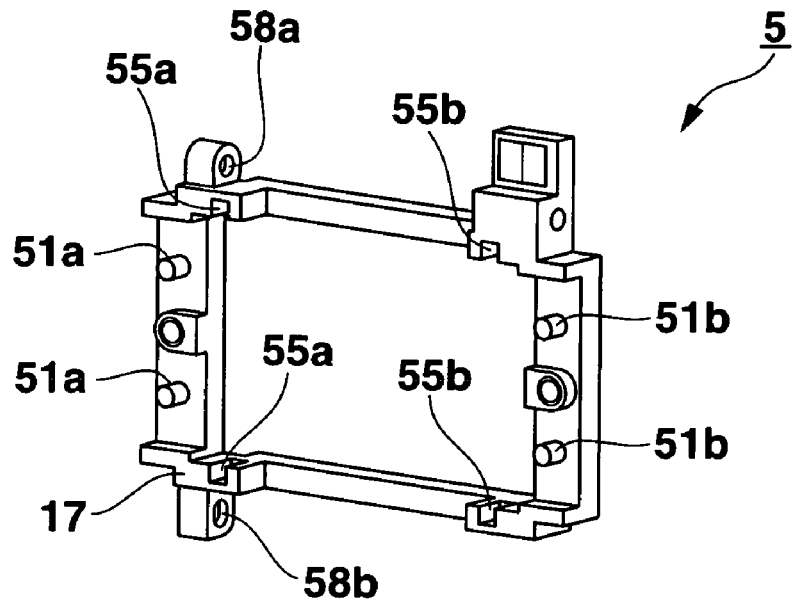
FIG. 5A is a perspective view of an X stage unit, as seen from its rear side.
Figure 5B:
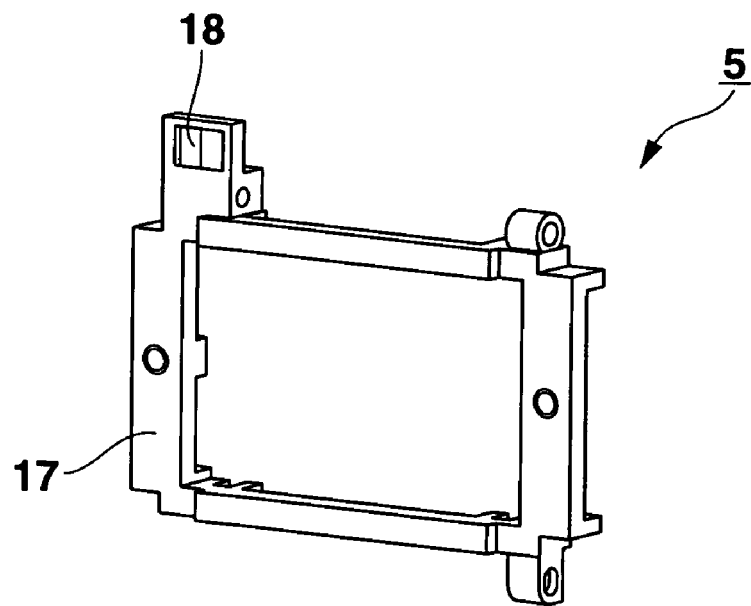
FIG. 5B is a perspective view of the X stage unit, as seen from its front side.

The X stage unit 5 comprises an X stage 17 and magnet 18, as shown in FIGS. 5A and 5B. The magnet 18 is prepared for detecting a displacement in the X-axis direction.

The magnet 18 is magnetized in the X-axis direction.

Figure 6A:
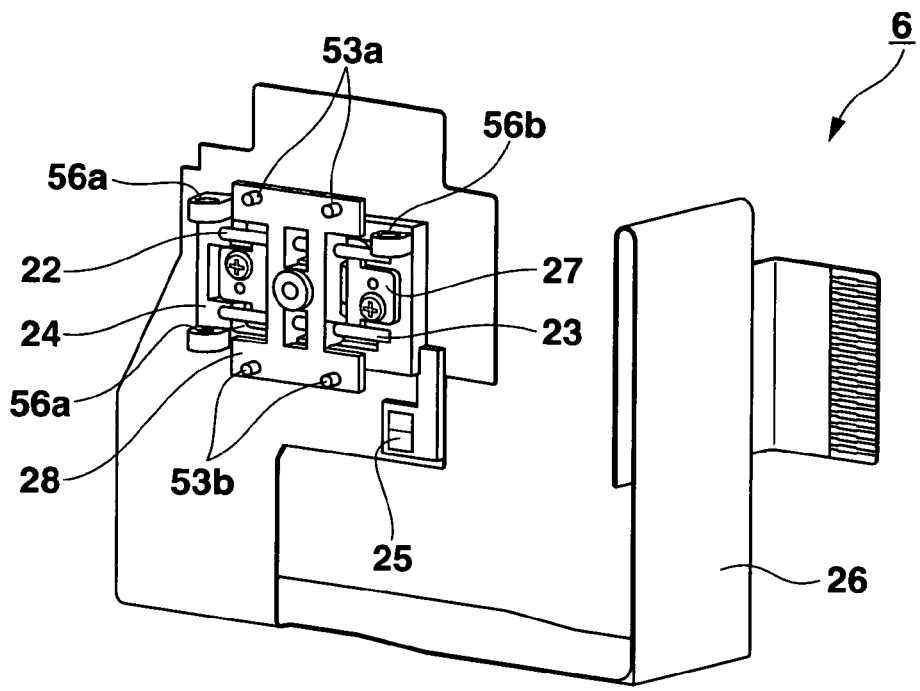
FIG. 6A is a perspective view of a Y stage unit as seen from its rear side.
Figure 6B:
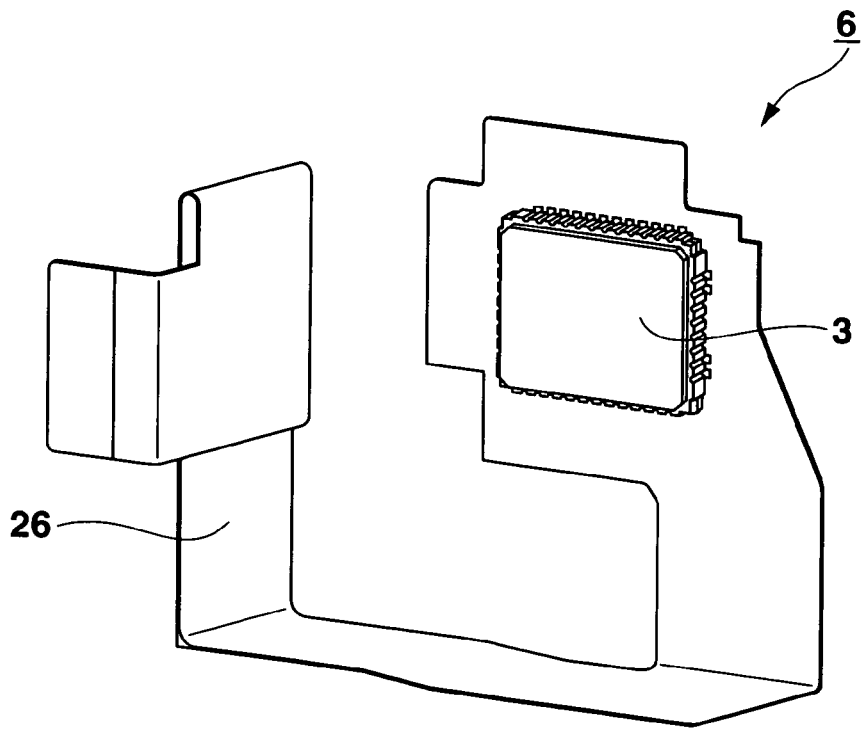
FIG. 6B is a perspective view of the Y stage unit as seen from its front side.

The Y stage unit 6 comprises a Y stage 24, a magnet 25, CCD 3, FPC 26, CCD holder 27 and actuator holder 28, as shown in FIGS. 6A and 6B. The magnet 25 is prepared for detecting a displacement in the Y-axis direction. The FPC 26 electrically connects CCD 3 to a main circuitry (not shown).

The magnet 25 is magnetized in the Y-axis direction.

CCD 3 is mounted on FPC 26 to be connected therewith, as clearly shown in FIG. 6B.

In the vicinity of the rear side of CCD 3 mounted on FPC 26, the CCD holder 27 firmly adheres to FPC 26 or to the rear surface of CCD 3.

Further, the CCD holder 27 is fixed to the Y stage by means of screws.

In short, CCD 3 is secured on the Y stage 24 through the CCD holder 27.

The Y stage 24 is provided with a pair of guide shafts 22, 23.

The actuator holder 28 is mounted on the Y stage 24, and allowed to reciprocally move along the guide shafts 22, 23.

In other words, the actuator holder 28 is reciprocally movable on the Y stage 24 along the guide shafts 22, 23 in the X-axis direction, as shown in FIGS. 7A, 7B and 7C.

Now, mechanical combination of the base unit 4 and X stage unit 5 will be described with reference to FIGS. 3A and 5A. Projections 51a, 51a provided on the X stage unit 5 (FIG. 5A) are engaged with holes 50a, 50a formed in the driving member 10a of the base unit 4 (FIG. 3A), respectively, and projections 51b, 51b provided on the X stage unit 5 (FIG. 5A) are engaged with holes 50b, 50b formed in the driving member 10b of the base unit 4 (FIG. 3A), respectively, whereby the X stage unit 5 is mechanically combined with the base unit 4.

Further, mechanical combination of the base unit 4 and Y stage unit 6 will be described with reference to FIGS. 3B and 6A. Projections 53a, 53a provided on the actuator holder 28 of the Y stage unit 6 (FIG. 6A) are engaged with holes 52a, 52a formed in the driving member 10c of the base unit 4 (FIG. 3B), respectively, and further projections 53b, 53b provided on the actuator holder 28 of the Y stage unit 6 (FIG. 6A) are engaged with holes 52b, 52b formed in the driving member 10d of the base unit 4 (FIG. 3B), respectively, whereby the Y stage unit 6 is mechanically combined with the base unit 4.

More specifically, as shown in FIG. 3A and FIG. 4, the holes 50a, 50a are formed in one end portion of the driving member 10a, and the other end portion thereof is fixed on the actuator 10 of the base plate 7. Meanwhile, the holes 50b, 50b are formed in one end portion of the driving member 10b, and the other end portion thereof is fixed on the actuator 10 of the base plate 7.

As described above, the base unit 4 and X stage unit 5 are mechanically combined with each other by means of the driving members 10a, 10b of the actuator 10.

Each engaging portion is secured by means of the holding member 32a or the holding member 32b, as shown in FIG. 2B.

In a similar manner, as shown in FIG. 3B and FIG. 4, the holes 52a, 52a are formed in one end portion of the driving member 10c, and the other end portion thereof is fixed on the actuator 10 of the base plate 7, and the holes 52b, 52b are formed in one end portion of the driving member 10d, and the other end portion thereof is fixed on the actuator 10 of the base plate 7.

As described above, the base unit 4 and Y stage unit 6 are mechanically combined with each other by means of the driving members 10c, 10d of the actuator 10.

Each engaging portion is secured by means of the holding member 32c, as shown in FIG. 2B.

The X stage unit 5 is constructed to slide on the base unit 4 along the guide shafts 29a, 29b in the X-axis direction, and the Y stage unit 6 is also constructed to slide on the base unit 4 along the guide shafts 30a, 30b in the Y-axis direction, as shown in FIG. 2B.

The guide shaft 30a is supported in shaft supporting portions 55a, 55a formed in the X stage unit 5 (FIG. 5A) and also secured by shaft supporting portions 56a, 56a provided on the Y stage unit 6 (FIG. 6A).

The guide shaft 30b is supported in shaft supporting portions 55b, 55b formed in the X stage unit 5 (FIG. 5A) and also secured by shaft supporting portions 56b, 56b provided on the Y stage unit 6 (FIG. 6A).

The guide shaft 29a is supported in shaft supporting portions 57a, 57a formed in the base unit 4 (FIG. 3A) and also secured by shaft supporting portions 58a, 58a provided on the X stage unit 5 (FIG. 5A).

Further, the guide shaft 29b is supported in shaft holding portions 57b, 57b formed in the base unit 4 (FIG. 3A) and also secured by shaft supporting portions 58b, 58b provided on the X stage unit 5 (FIG. 5A).

Being mounted on the base unit 4 as described above, CCD 3 is allowed to move on the base unit 4 in the X-axis direction and also in the Y-axis direction.

The actuator holder 28 is arranged to move relatively to the Y stage 24 along the guide shafts 22, 23 in the X-axis direction, as shown in FIGS. 7A, 7B and 7C.

Therefore, even if torsional stress is yielded in the driving members 10c, 10d of the actuator 10 when the Y stage unit 6 moves in the Y-axis direction while the X stage unit 5 is moving in the X-axis direction, such torsional stress is reduced by the reciprocal movement of the actuator holder 28.

In the embodiment of the apparatus for correcting camera shake, elastic-film actuators such as polymer actuators made of an Ionic Polymer-Metal Composite film (IPMC film) are used as the driving members 10a, 10b, 10c and 10d of the actuator 10.

The polymer actuators made of an Ionic Polymer-Metal Composite film (IPMC film) uses a phenomenon that when a voltage is applied across a pair of electrodes (positive and negative electrodes) holding an ionic conductive resign film between them, water contained within polymer member moves toward the negative electrode together with plus ions, and therefore a portion of the resign film close to the negative electrode expands or increases in length, and meanwhile water decreases in polymer member close to the positive electrode, and therefore a portion of the resign film close to the positive electrode shrinks or decreases in length. That is, the polymer actuators made of an Ionic Polymer-Metal Composite film (IPMC film) uses ancylo movement of the Ionic Polymer-Metal Composite film (IPMC film).

The polymer actuators of an Ionic Polymer-Metal Composite film (IPMC film) are used to move the X stage unit 5 and Y stage unit 6 relatively to the base unit 4.

Note that, for convenience sake, the driving members of the actuator 10 are described as structural members of the base unit 4 in the above description.

However, the driving members 10a, 10b of the actuator may be deemed as the structural members of the X stage unit 5, or only either one of them may be deemed as the structural member of the X stage unit 5. Further, the driving members 10c, 10d of the actuator may be deemed as the structural members of the Y stage unit 6, or only either one of them may be deemed as the structural member of the Y stage unit 6.

In short, in the present embodiment of the invention, the apparatus for correcting camera shake is provided with the lens unit 1 including the optical lens 101, CCD 3 or an image capturing element disposed on the optical axis of the optical lens 101, the Y stage unit 6 or a first stage unit with CCD 3 disposed on its stage, the base unit 4 or a second stage unit, and the X stage unit 5 or a third stage unit. The base unit 4 or the second stage unit is disposed at a first position relative to CCD 3 to keep the image capturing surface of CCD 3 between them, wherein the base unit 4 is provided with the driving member 10a or 10b as first elastic members and is connected with the Y stage unit 6 by means of the driving member 10a or 10b. The X stage unit 5 or the third stage unit is disposed at a second position relative to CCD 3 to keep the image capturing surface of CCD 3 between them on a line bisecting at right angles a line connecting the driving member 10a and driving member 10b, wherein the X stage unit 5 is provided with the driving member 10c or 10d as second elastic members and is connected with the base unit 4 by means of the driving member 10c or 10d. The driving members 10a, 10b are fixed to the Y stage unit 6 with one end portions thereof and also connected to the base unit 4 with the other end portions thereof. The driving member 10c, 10d are fixed to the base unit 4 with one end portions thereof and also connected to the X stage unit 5 with the other end portions thereof. Further, the base unit 4 is fixed to the lens unit 1.

Now, movement of CCD 3 in the X-axis direction will be described.

Figure 8A:
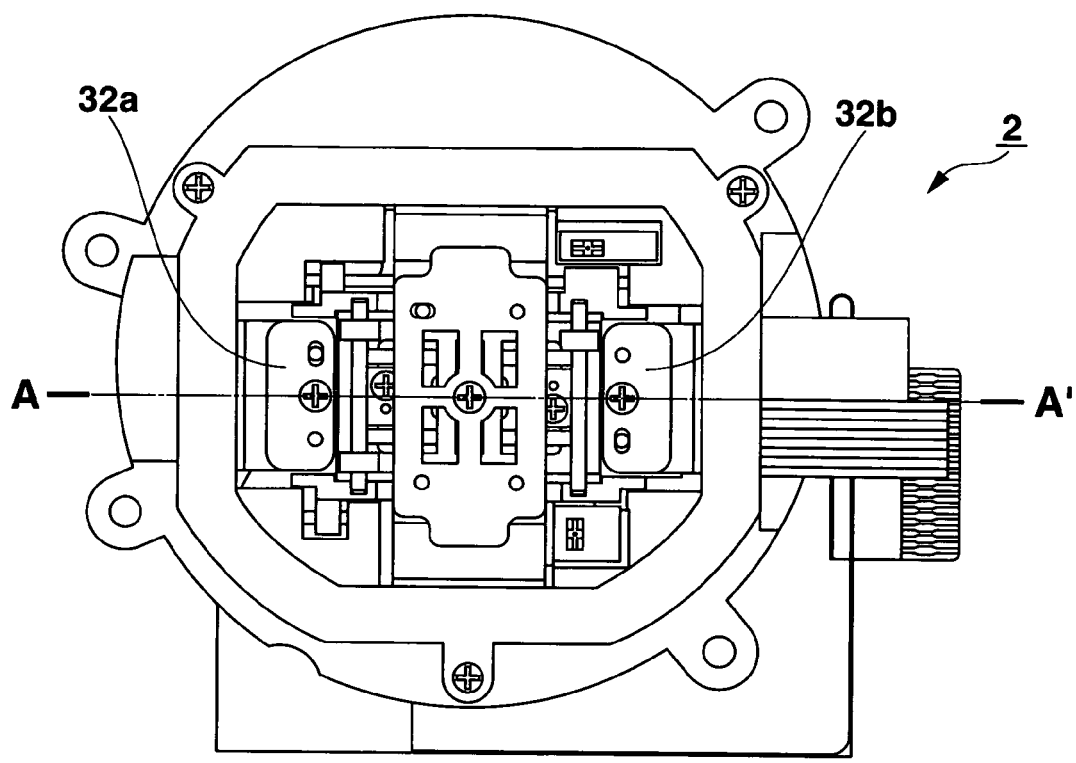
FIG. 8A is a rear view of a CCD stage unit, which stays at a base position.
Figure 8B:
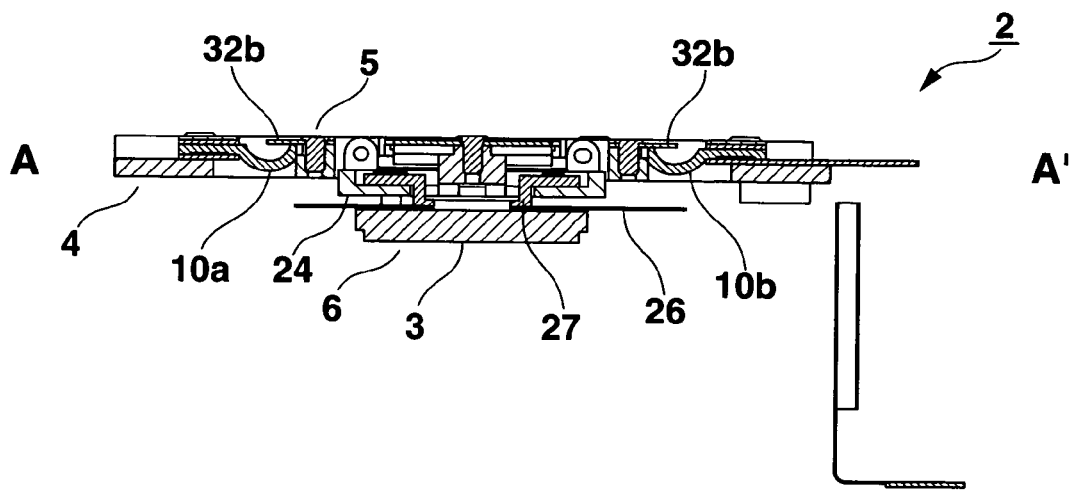
FIG. 8B is a cross sectional view of the CCD stage unit, which stays at the base position.

While CCD 3 stays at the central position of the base unit 4, the driving member 10a and driving member 10b, each connected between the base unit 4 and X stage unit 5, bend beneath in the substantially same shape to keep balance, as seen in FIGS. 8A and 8B, thereby keeping the CCD 3 at the central position of the base unit 4. The driving member 10a and driving member 10b are kept in the arch-like shapes of the same curvature to keep balance.

Figure 9A:
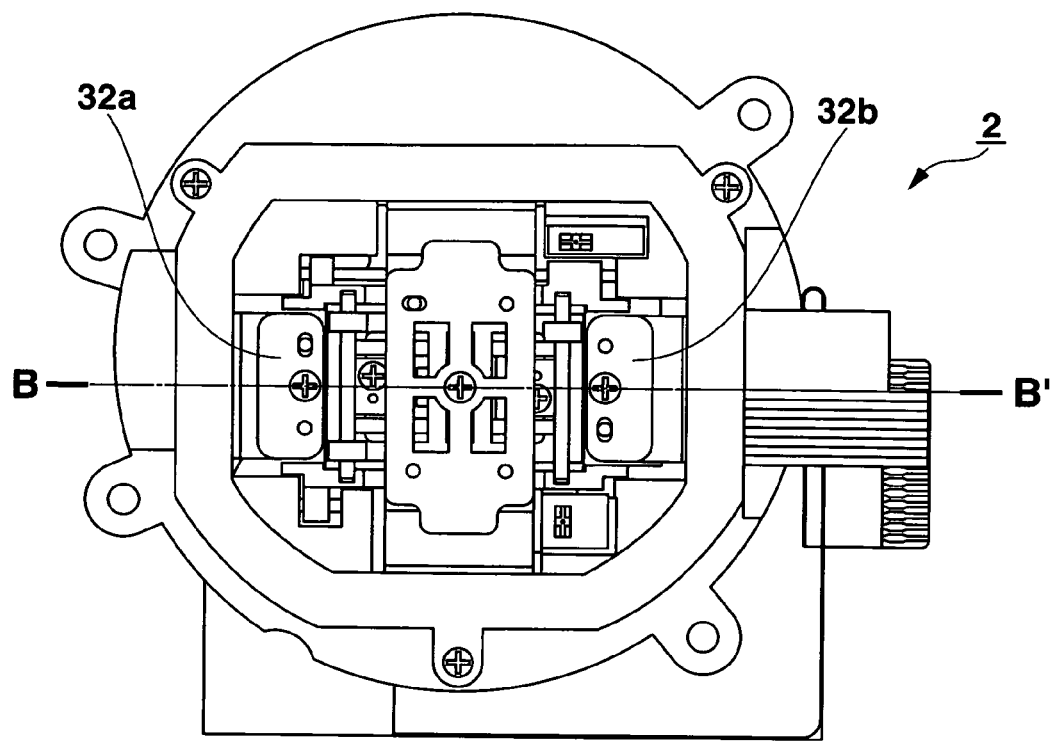
FIG. 9A is a rear view of the CCD stage unit, which has moved leftward, as seen in the drawing.
Figure 9B:
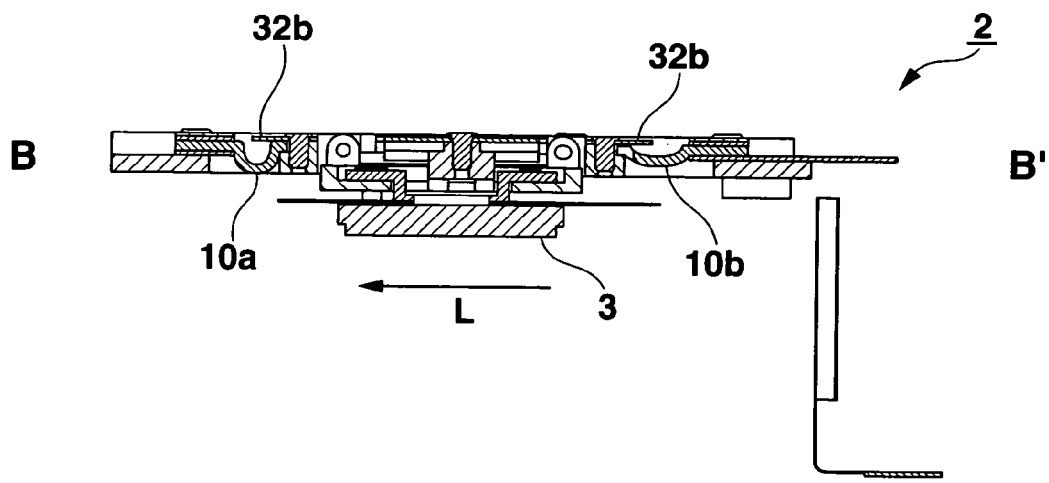
FIG. 9B is a cross sectional view of the CCD stage unit, which has moved leftward as indicated by an arrow L.

FIGS. 9A and 9B are views showing CCD 3, which has been moved leftward as seen in the drawing (indicated by an arrow L in FIG. 9B) from the central position shown in FIGS. 8A and 8B.

To the driving member 10a kept in a curved state, a voltage is applied such that the rear surface (surface in a side opposite to CCD 3) of the driving member 10a is kept at a positive electric potential and the front surface (surface in the same side as CCD 3) is kept at a negative electric potential.

Then, the rear surface of the driving member 10a, which is kept at a positive electric potential, reduces in length and the front surface, which is kept at a negative electric potential, increases in length, whereby the driving member 10a bends more sharply or bends to form an arch-like shape of a larger curvature.

As a result, CCD 3 is pulled leftward as seen in the drawing (as indicated by the arrow L in FIG. 9B) by X stage unit 5.

Further, at the same time, a voltage is applied to the driving member 10b such that the rear surface (surface in the side opposite to CCD 3) of the driving member 10b is kept at a negative electric potential and the front surface (surface in the same side as CCD 3) is kept at a positive electric potential.

Then, the rear surface of the driving member 10b, which is kept at a negative electric potential, increases in length and the front surface, which is kept at a positive electric potential, decreases in length, whereby the driving member 10b bends to form an arch-like shape of a less curvature.

As a result, CCD 3 is pushed leftward as seen in the drawing (as indicated by the arrow L in FIG. 9B) by X stage unit 5.

As described above, since the driving member 10a and driving member 10b, disposed at both sides of CCD 3 and in the X-axis direction, change in shape in an opposite way, that is, one to form an arch-like shape of a larger curvature and other to form an arch-like shape of a less curvature, CCD 3 is moved leftward as indicated by the arrow L in FIG. 9B. CCD 3 is moved leftward under strong power.

Figure 10A:
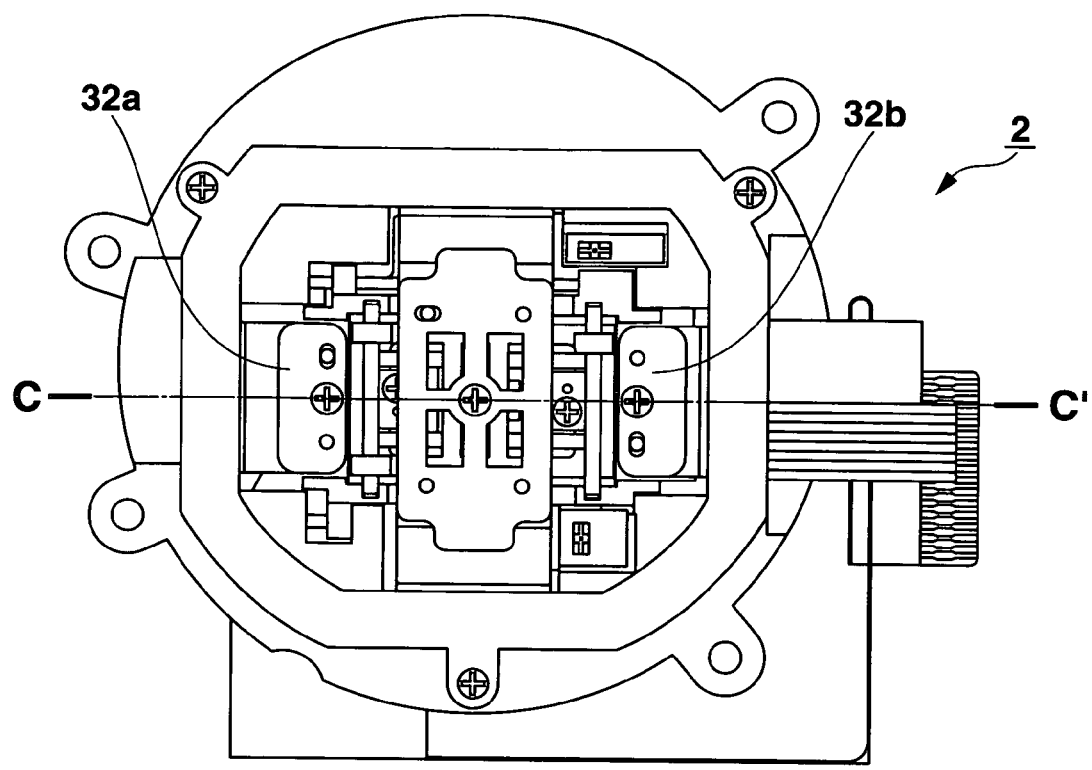
FIG. 10A is a rear view of the CCD stage unit, which has moved rightward, as seen in the drawing.
Figure 10B:
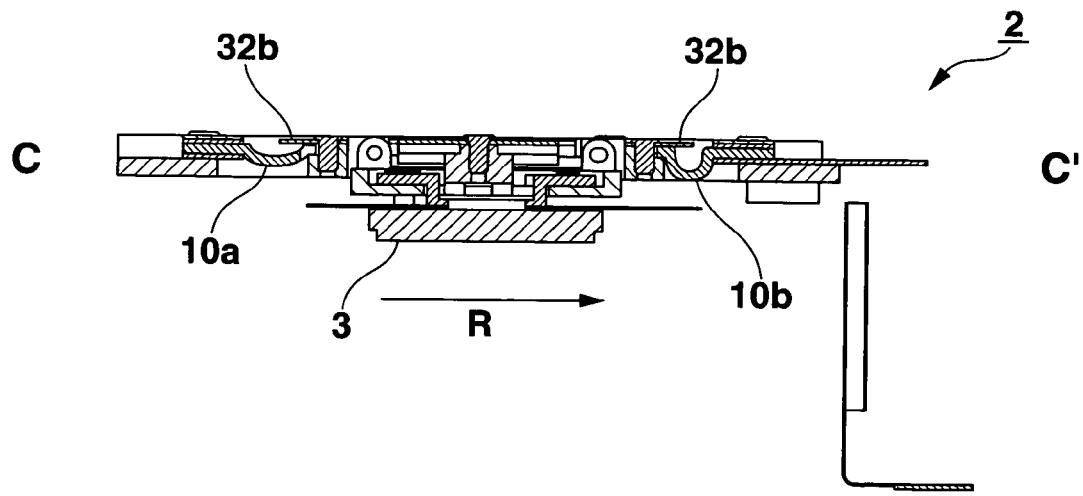
FIG. 10B is a cross sectional view of the CCD stage unit, which has moved rightward as indicated by an arrow R.

FIGS. 10A and 10B are views showing CCD 3, which has been moved rightward as seen in the drawing (indicated by an arrow R in FIG. 10B) from the central position shown in FIGS. 8A and 8B.

A voltage is applied to the driving member 10a such that the rear surface (surface in a side opposite to CCD 3) of the driving member 10a is kept at a negative electric potential and the front surface (surface in the same side as CCD 3) is kept at a positive electric potential.

Then, the rear surface of the driving member 10a, which is kept at a negative electric potential, increases in length and the front surface, which is kept at a positive electric potential, decreases in length, whereby the driving member 10a bends to form an arch-like shape of a less curvature.

As a result, CCD 3 is pushed rightward as seen in the drawing (as indicated by the arrow R in FIG. 10B) by X stage unit 5.

Further, at the same time, a voltage is applied to the driving member 10*b* such that the rear surface (surface in the side opposite to CCD 3) of the driving member 10*b* is kept at a positive electric potential and the front surface (surface in the same side as CCD 3) is kept at a negative electric potential.

Then, the rear surface of the driving member 10*b*, which is kept at a positive electric potential, decreases in length and the front surface, which is kept at a negative electric potential, increases in length, whereby the driving member 10*b* bends to form an arch-like shape of a larger curvature.

As a result, CCD 3 is pulled rightward as seen in the drawing (as indicated by the arrow R in FIG. 10B) by X stage unit 5.

As described above, since the driving member 10*a* and driving member 10*b*, disposed at both sides of CCD 3 and in the X-axis direction, change in shape in an opposite way, that is, one to form an arch-like shape of a larger curvature and other to form an arch-like shape of a less curvature, CCD 3 is moved rightward as indicated by the arrow R in FIG. 10B.

Now, movement of CCD 3 in the Y-axis direction will be described.

Figure 11B:
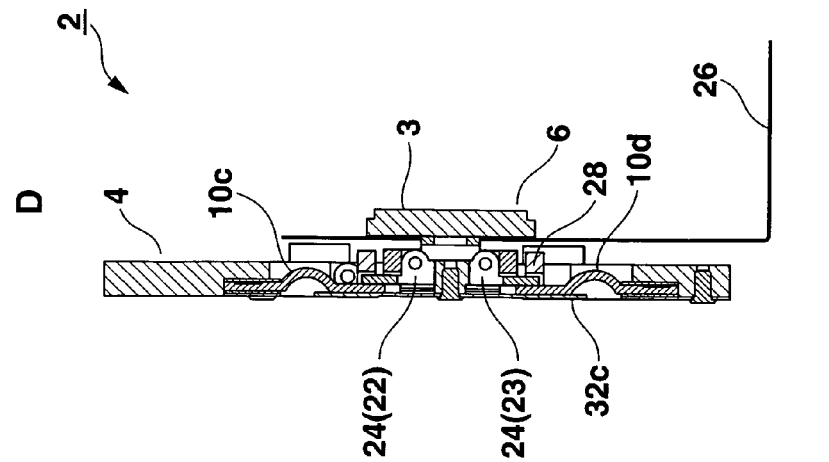
FIG. 11B is a cross sectional view of the CCD stage unit, which stays at the base position.
Figure 11A:
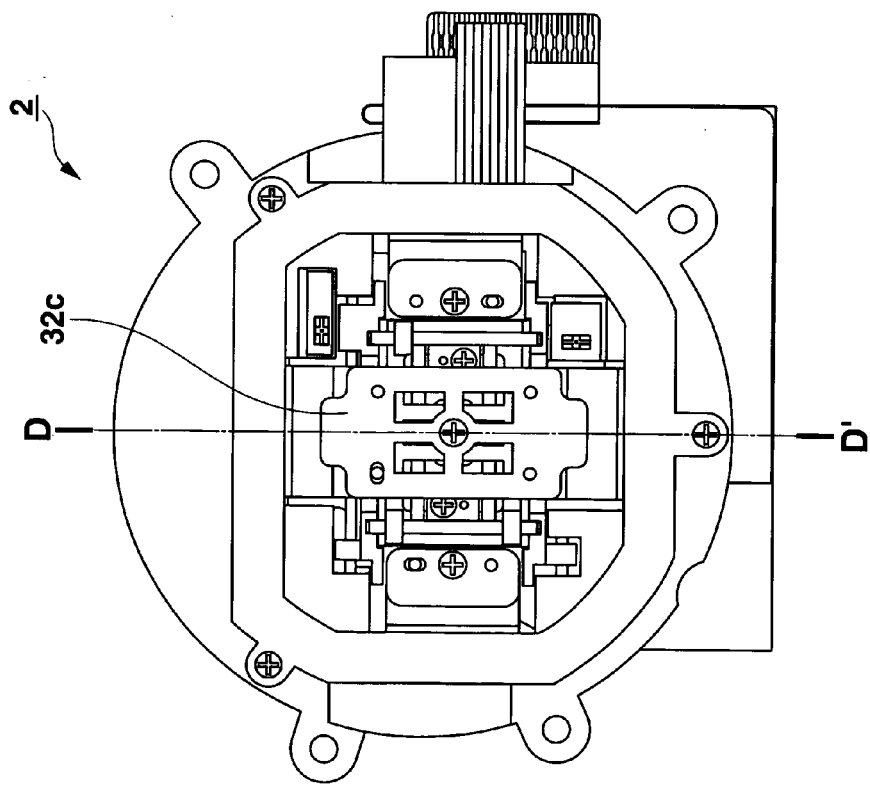
FIG. 11A is a rear view of the CCD stage unit, which stays at a base position.

While CCD 3 stays at the central position of the base unit 4, the driving member 10*c* and driving member 10*d* bend to form substantially same shapes to maintain balance, as shown in FIGS. 11A and 11B. The driving member 10*c* and driving member 10*d* keep arch-like shapes of the same curvature respectively to maintain balance.

Figure 12B:
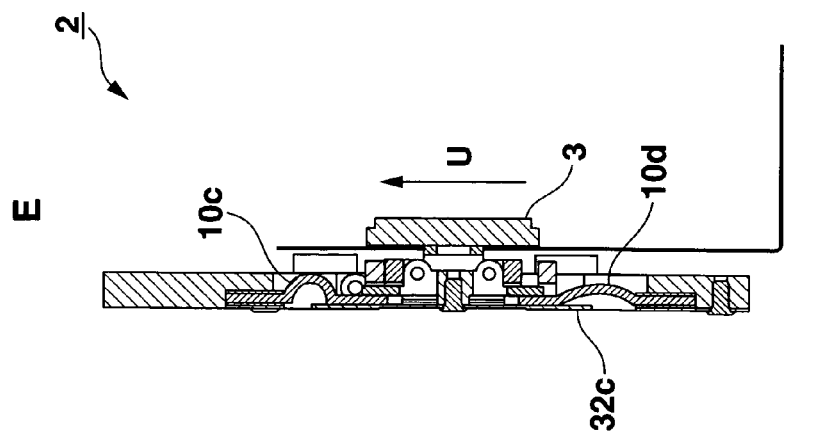
FIG. 12B is a cross sectional view of the CCD stage unit, which has moved CCD upward, as indicated by an arrow U.
Figure 12A:
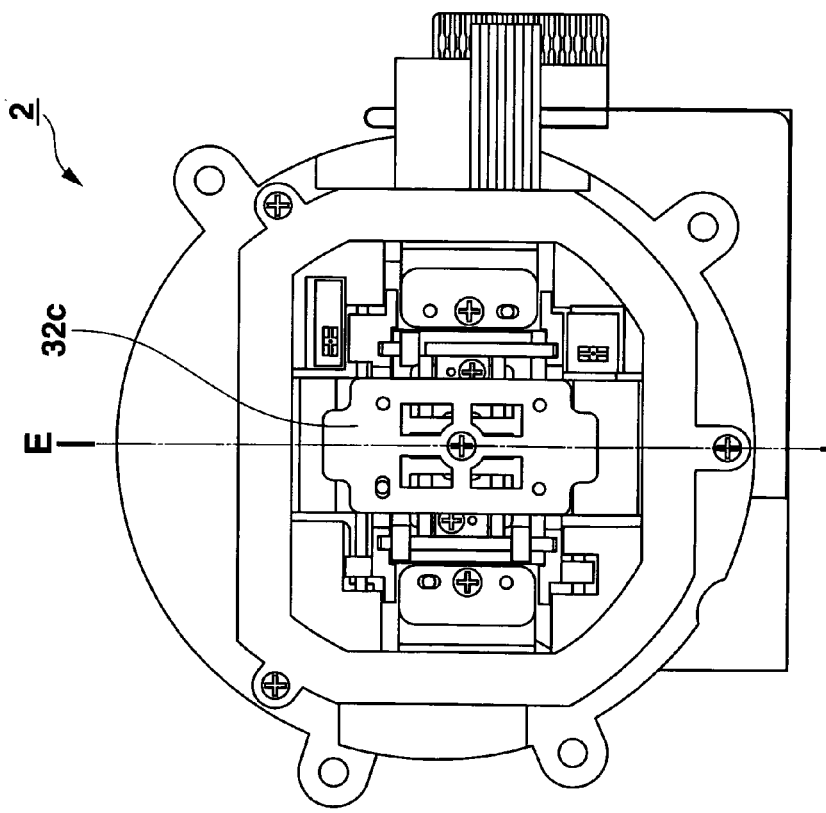
FIG. 12A is a rear view of CCD, which has moved upward, as seen in the drawing.

FIGS. 12A and 12B are views showing CCD 3, which has been moved upward as seen in the drawing (indicated by an arrow U in FIG. 12B) from the central position shown in FIGS. 11A and 11B.

To the driving member 10*c* kept in an arch-like shape, a voltage is applied such that the rear surface (surface in a side opposite to CCD 3) of the driving member 10*c* is kept at a positive electric potential and the front surface (surface in the same side as CCD 3) is kept at a negative electric potential.

Then, the rear surface of the driving member 10*c*, which is kept at a positive electric potential, decreases in length and the front surface thereof, which is kept at a negative electric potential, increases in length, whereby the driving member 10*c* bends more sharply or bends to form an arch-like shape of a larger curvature.

As a result, CCD 3 is pulled upward as seen in the drawing (as indicated by the arrow U in FIG. 12B) by Y stage unit 6.

Further, at the same time, a voltage is applied to the driving member 10*d* such that the rear surface (surface in the side opposite to CCD 3) of the driving member 10*d* is kept at a negative electric potential and the front surface (surface in the same side as CCD 3) thereof is kept at a positive electric potential.

Then, the rear surface of the driving member 10*d*, which is kept at a negative electric potential, increases in length and the front surface, which is kept at a positive electric potential, decreases in length, whereby the driving member 10*b* bends to form an arch-like shape of a less curvature.

As a result, CCD 3 is pushed upward as seen in the drawing (as indicated by the arrow U in FIG. 12B) by Y stage unit 6.

As described above, since the driving member 10*c* and driving member 10*d*, disposed in the Y-axis direction, change in shape in an opposite way, that is, one to form an arch-like shape of a larger curvature and other to form an arch-like shape of a less curvature, CCD 3 is moved upward as indicated by the arrow U in FIG. 12B.

Figure 13B:
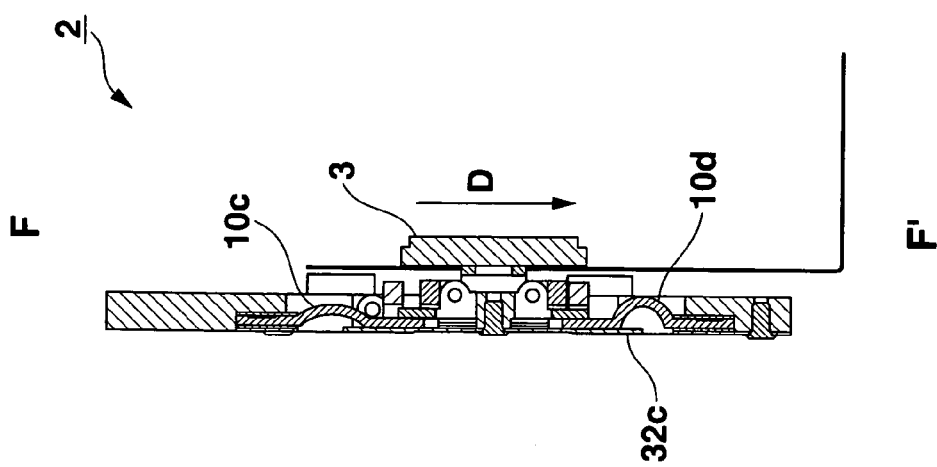
FIG. 13B is a cross sectional view of the CCD stage unit, which has moved CCD downward as indicated by an arrow D.
Figure 13A:
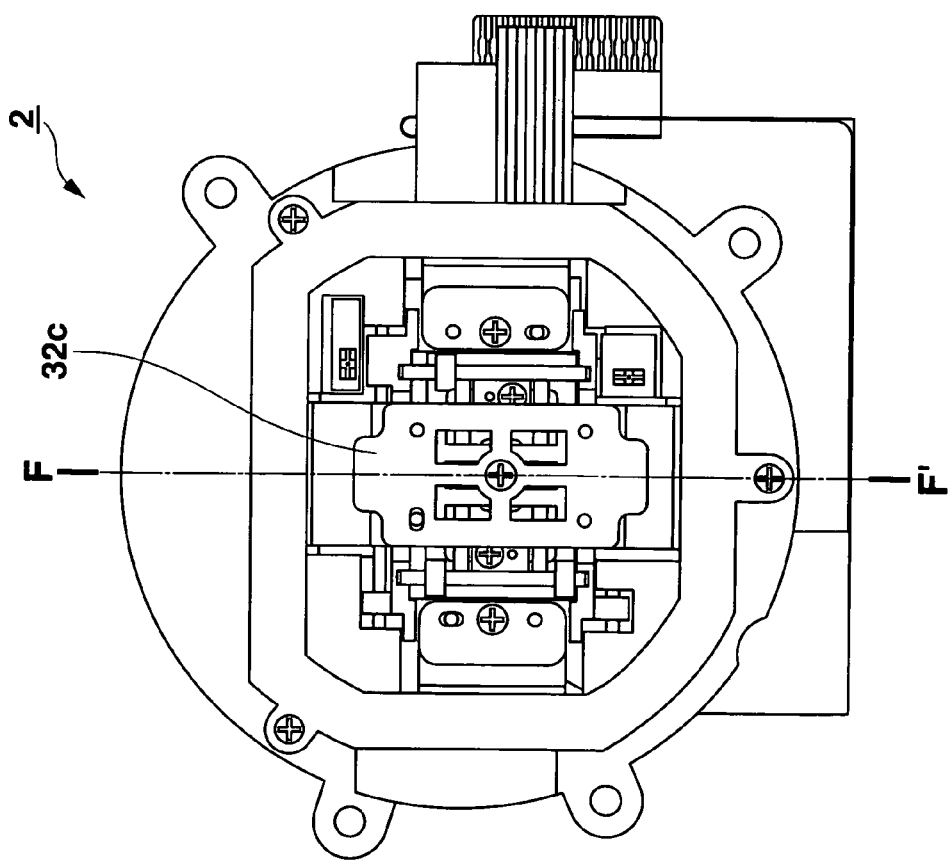
FIG. 13A is a rear view of CCD, which has moved downward, as seen in the drawing.

FIGS. 13A and 13B are views showing CCD 3, which has been moved downward as seen in the drawing (as indicated by an arrow D in FIG. 13B) from the central position shown in FIGS. 11A and 11B.

A voltage is applied to the driving member 10*c* such that the rear surface (surface in a side opposite to CCD 3) of the driving member 10*c* is kept at a negative electric potential and the front surface (surface in the same side as CCD 3) thereof is kept at a positive electric potential.

Then, the rear surface of the driving member 10*c*, which is kept at a negative electric potential, increases in length and the front surface, which is kept at a positive electric potential, decreases in length, whereby the driving member 10*c* bends to form an arch-like shape of a less curvature.

As a result, CCD 3 is pushed downward as seen in the drawing (as indicated by the arrow D in FIG. 13B) by Y stage unit 6.

Further, at the same time, a voltage is applied to the driving member 10*d* such that the rear surface (surface in the side opposite to CCD 3) of the driving member 10*d* is kept at a positive electric potential and the front surface (surface in the same side as CCD 3) thereof is kept at a negative electric potential.

Then, the rear surface of the driving member 10*d*, which is kept at a positive electric potential, decreases in length and the front surface thereof, which is kept at a negative electric potential, increases in length, whereby the driving member 10*d* bends to form an arch-like shape of a larger curvature.

As a result, CCD 3 is pulled downward as seen in the drawing (as indicated by the arrow D in FIG. 13B) by Y stage unit 6.

As described above, since the driving member 10*c* and driving member 10*d*, disposed in the Y-axis direction, change in shape in an opposite way, that is, one to form an arch-like shape of a larger curvature and other to form an arch-like shape of a less curvature, CCD 3 is moved downward as indicated by the arrow D in FIG. 13B.

A relative position of CCD 3 to the lens unit 1 is detected based on a position of the base unit 4, wherein a relative position of the base unit 4 to the lens unit 1 is fixed.

Change in a magnetic field of a magnet 18 mounted on the X stage unit 5 is detected by the hole sensor 13 mounted on the base unit 4, whereby the relative position of CCD 3 to the lens unit 1 in the X-axis direction is detected.

Meanwhile, change in a magnetic field of a magnet 25 mounted on the Y stage unit 6 is detected by the hole sensor 15 mounted on the base unit 4, whereby the relative position of CCD 3 to the lens unit 1 in the Y-axis direction is detected.

Figure 14:
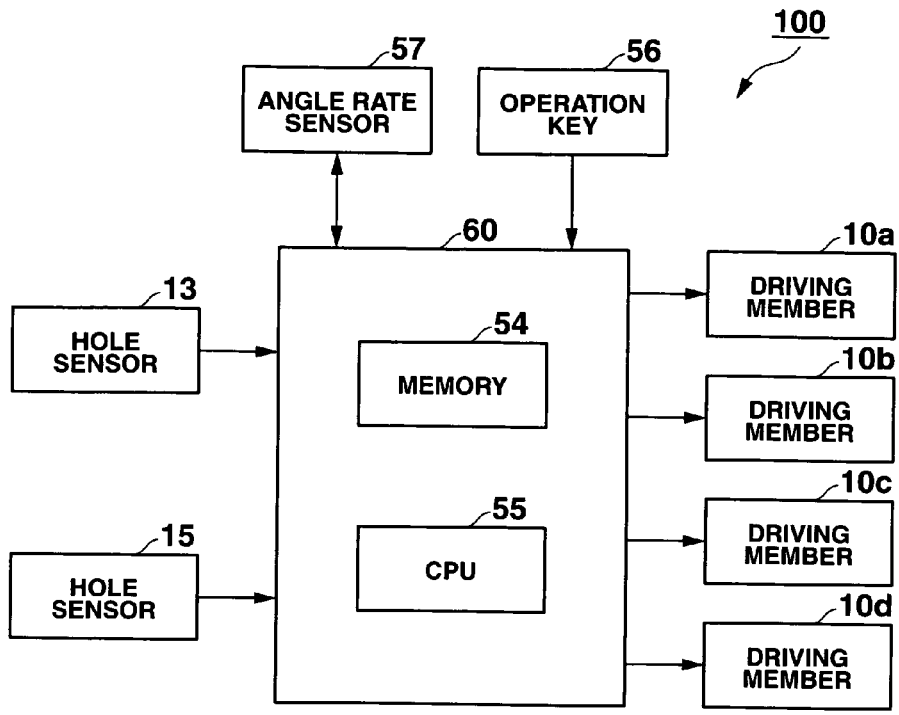
FIG. 14 is a block diagram showing a circuit configuration of a circuitry relating to a camera shake correcting function.

FIG. 14 is a block diagram of a circuit configuration of a circuit relating a hand shake correcting function.

A control unit 60 has a memory 54 and CPU 55. The memory 54 stores a computer program and CPU 55 executes various processes in accordance with the computer program stored in the memory 54.

Figure 15:
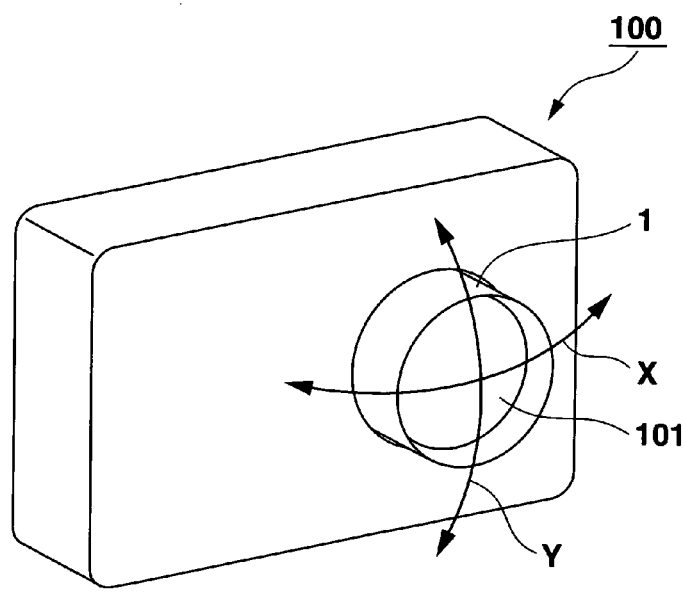
FIG. 15 is a view for explaining displacement amounts detected by an angle rate sensor.

More specifically, when an operation key 56 such as a shutter key is operated halfway by a user, wherein the operation key 56 is provided on a digital camera 100, CPU 55 detects operation of the operation key 56, and makes an angle rate sensor detect angle rates of the digital camera 100 in the X-axis direction and in the Y-axis direction, as shown in FIG. 15.

Then, calculating displacement amounts (amount of hand shake) of an optical image relatively to the image capturing plane of CCD 3 depending on the angle rates detected by the angle rate sensor 57, CPU 55 controls the driving member 10*a*, driving member 10*b*, driving member 10*c* and driving member 10*d* to keep the optical image projected by CCD 3 substantially at the same position on the image capturing plane of CCD 3, that is, to cancel hand shake.

At this time, while the position of CCD 3 is being detected based on outputs from the hole sensor 13 and hole sensor 15, CCD 3 is controlled to move by necessary amounts in the X-axis direction and in Y-axis direction.

As described above, since in the embodiment of the apparatus for correcting camera shake are used elastic film members, which change their shape when voltages are applied to the actuator, hand shake can be corrected with no backrush and without any noises such as driving sounds and gear sounds, and further the elastic film members used in the embodiment generate no heat differently from a voice-coil motor.

Since one end portions of the driving members 10a, 10b, 10c and 10d each are connected to the base unit 4 under the substantially same condition, the stress, which is applied to the driving members when they move in appropriate directions, can be made equivalent between them.

In short, a similar driving state can be realized even though CCD 3 should move in any direction, which allows more stable hand shake correcting operation.

Further, in the embodiment described above, motive energy yielded in each driving member is transmitted directly to CCD 3 without any loss to move the same, whereby power consumption is reduced.

Figure 16A:
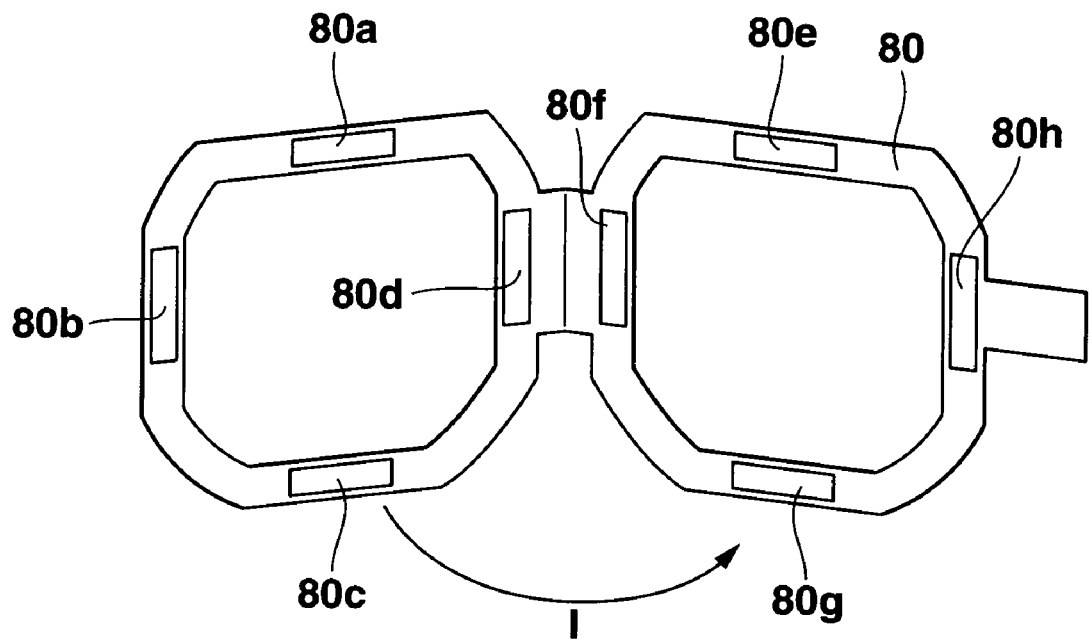
FIG. 16A is a perspective view showing flexible printed circuits in an open state.
Figure 16B:
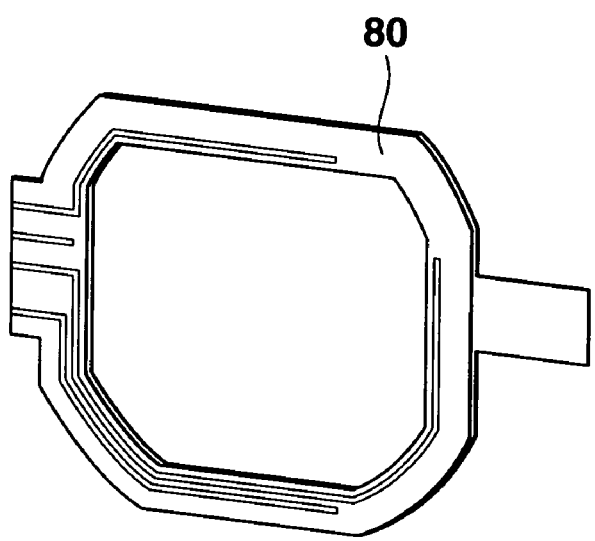
FIG. 16B is a perspective view showing flexible printed circuits in a closed state.

An arrangement in which a pair of FPCs 8, 9 hold the actuator 10 between them has been described above, but another arrangement may be employed, in which the pair of FPCs 8, 9 are made of a single sheet of FPC 80 as shown in FIG. 16A, and the sheet of FPC 80 is folded at the middle to sandwich in the actuator 10 between them as shown in FIG. 16B.

Further, the FPC 80 may be used to electrically connect the hole sensor 13 and hole sensor 15 to a circuitry (not shown), thereby reducing the number of parts to be used.

In the embodiment described above, a pair of driving members is used for the X-axis direction and another pair of driving members is used for Y-axis direction, but one driving member may be used in place of the pair of driving members.

The actuator 10 is fixed on the base plate 7 by means of screws, but may be secured by means of elastic members such as springs.

Second Embodiment

Now, the second embodiment of the apparatus for correcting camera shake according to the present invention will be described in detail.

In the second embodiment, like reference numerals represent like elements of the first embodiment and a further description thereof will be omitted.

Figure 17:
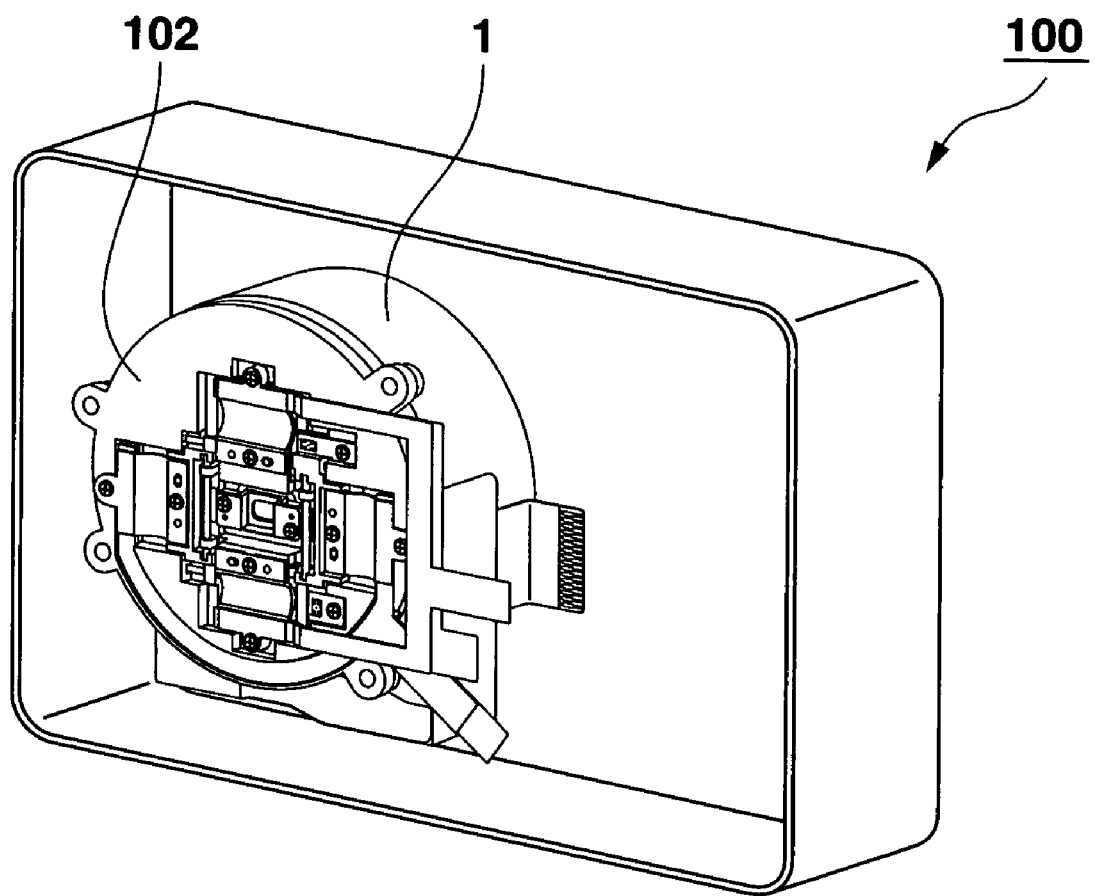
FIG. 17 is a perspective view of an inside of the digital camera in a second embodiment, as seen from its rear side, and in particular, showing a lens unit in detail.

FIG. 17 is a perspective view showing an inside of the digital camera 100 as viewed from the rear side thereof. CCD stage unit 102 is received in the lens unit 1.

Figure 18A:
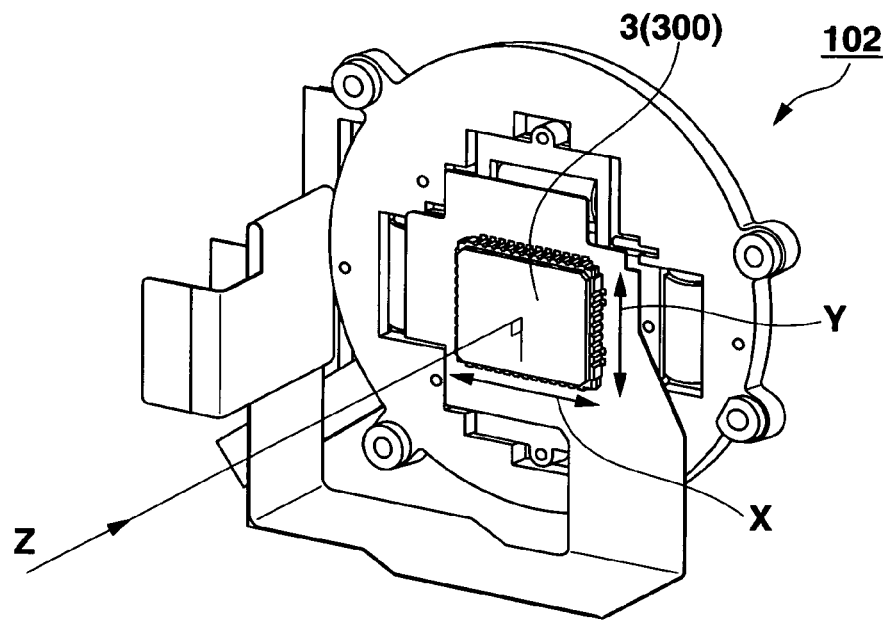
FIG. 18A is a perspective view of a CCD stage unit in the second embodiment, as seen from its front side.

As shown in FIG. 18A, the CCD stage unit 102 is provided with CCD 3 in the same manner as in the first embodiment.

Figure 18B:
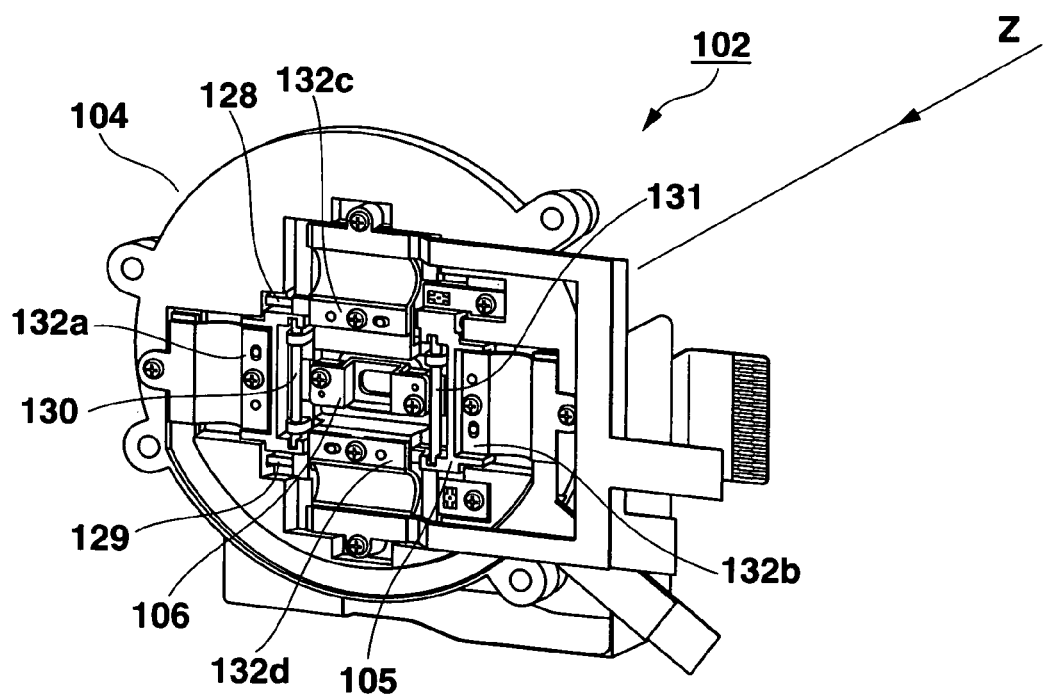
FIG. 18B is a perspective view of the CCD stage unit in the second embodiment, as seen from its rear side.

As shown in FIG. 18B, the CCD stage unit 102 comprises a base unit 104, an X stage unit 105, and a Y stage unit 106, wherein the X stage unit 105 serves to move CCD 3 in the X-axis direction, and the Y stage unit 106 serves to move CCD 3 in the Y-axis direction.

Figure 19A:
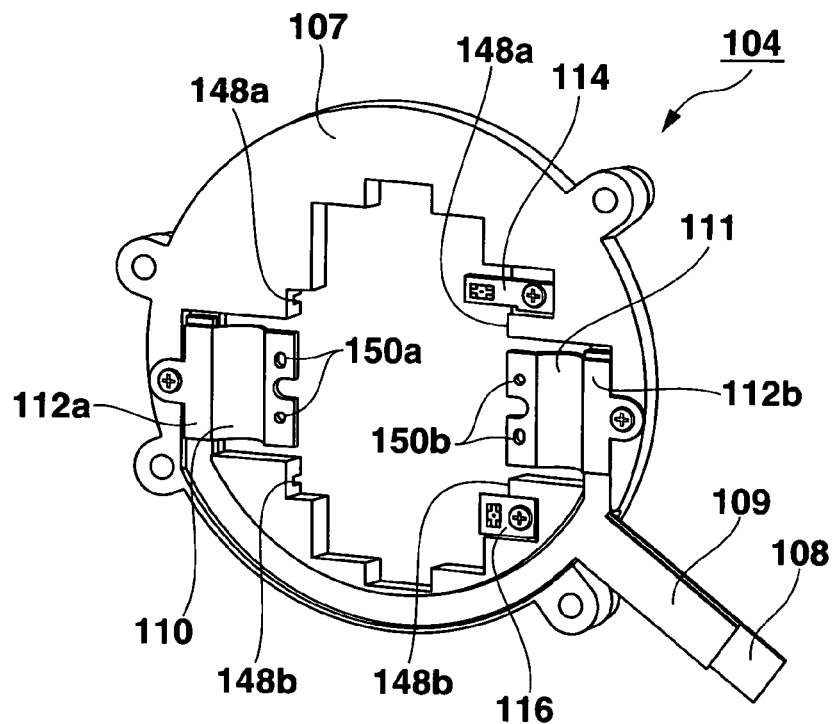
FIG. 19A is a perspective view of a base unit in the second embodiment, as seen from its front side.
Figure 19B:
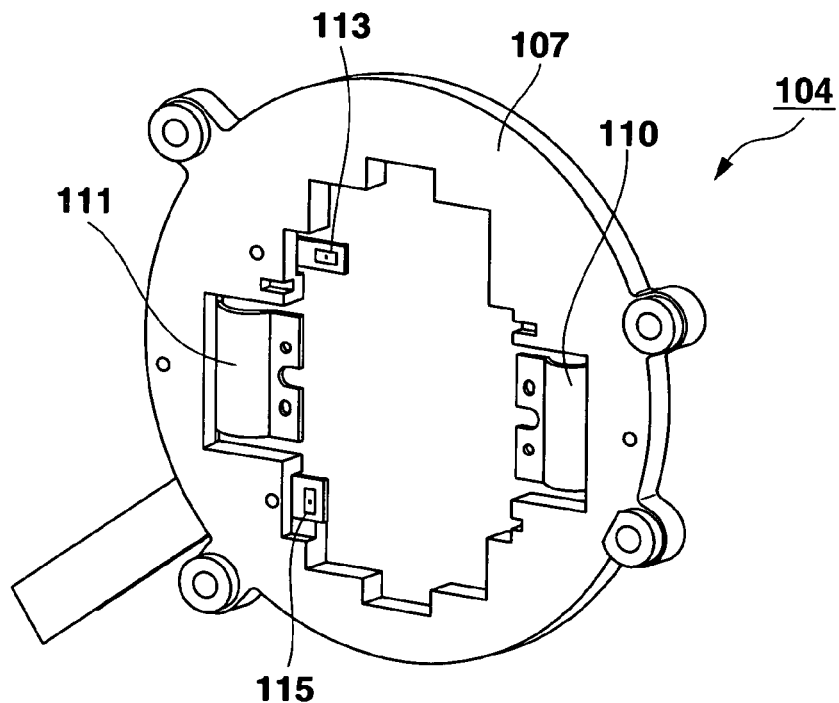
FIG. 19B is a perspective view of the base unit in the second embodiment, as seen from its rear side.

Further, as shown in FIGS. 19A and 19B, the base unit 104 comprises a base plate 107, actuators 110, 111, FPCs (Flexible Printed Circuits) 108 and 109 for applying voltages from the circuit portion (not shown) to the actuators 110, 111 to drive the same, holding members 112a, 112b for holding FPCs 108, 109 and actuators 110, 111, hole sensor 113 for detecting a displacement in the X-axis direction, substrate 114 for holding the hole sensor 113, hole sensor 115 for detecting a displacement in the Y-axis direction, and substrate 116 for holding the hole sensor 115, wherein the actuators 110, 111 are adapted to move CCD 3 in the X-axis direction with the aid of the X stage unit 105 and Y stage unit 106.

The FPCs 108, 109, holding members 112a, 112b, substrate 114, and substrate 116 are fixed to the base plate 107 by means of screws.

Meanwhile, apart of FPC 108 and apart of FPC 109 sandwich in one end of the actuator 110 therebetween, and further are held between the holding member 112a and the base plate 107, whereby the actuator 110 is secured to the base plate 107 with the FPC 108 sandwiched in therebetween.

Further, a part of FPC 108 and a part of FPC 109 sandwich in one end of the actuator 111 therebetween, and further are held between the holding member 112b and the base plate 107, whereby the actuator 111 is secured to the base plate 107 with the FPC 108 sandwiched in therebetween.

FPC 108 has an electrode on the front surface (surface in the same side as CCD 3) of the actuator 110 and another electrode on the surface (surface in the same side as CCD 3) of the actuator 111, and is electrically connected to these electrodes separately.

When the circuitry (not shown) applies voltages to FPC 108, an electric potential on the front surface of the actuator 110 and an electric potential on the front surface of the actuator 111 are controlled separately.

FPC 109 has an electrode on the rear surface (surface in the side opposite to CCD 3) of the actuator 110 and another electrode on the rear surface (surface in the side opposite to CCD 3) of the actuator 111, and is electrically connected to these electrodes separately.

When the circuitry (not shown) applies voltages to FPC 109, an electric potential on the rear surface of the actuator 110 and an electric potential on the rear surface of the actuator 111 are controlled separately.

Figure 20A:
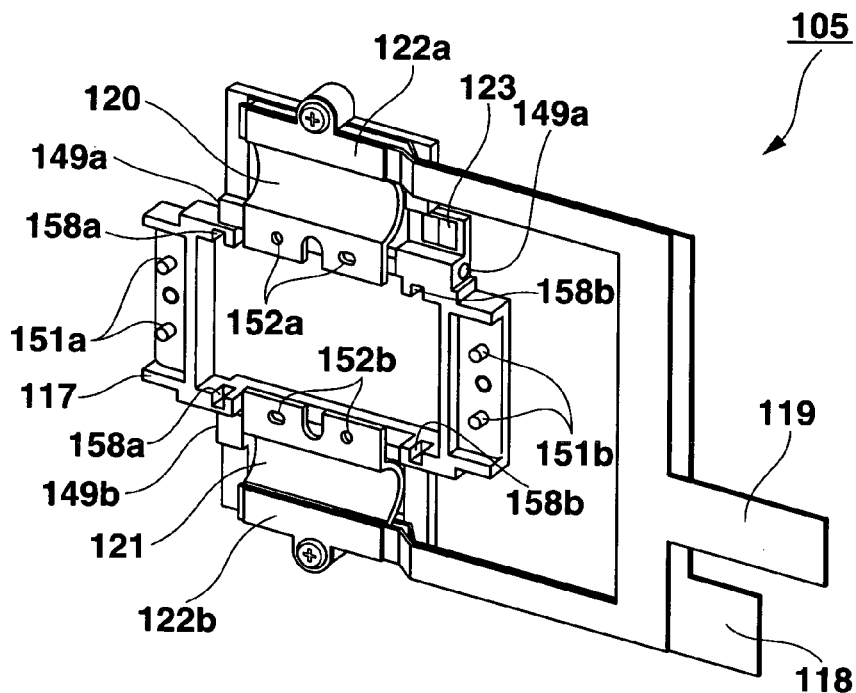
FIG. 20A is a perspective view of an X stage unit in the second embodiment, as seen from its front side.
Figure 20B:
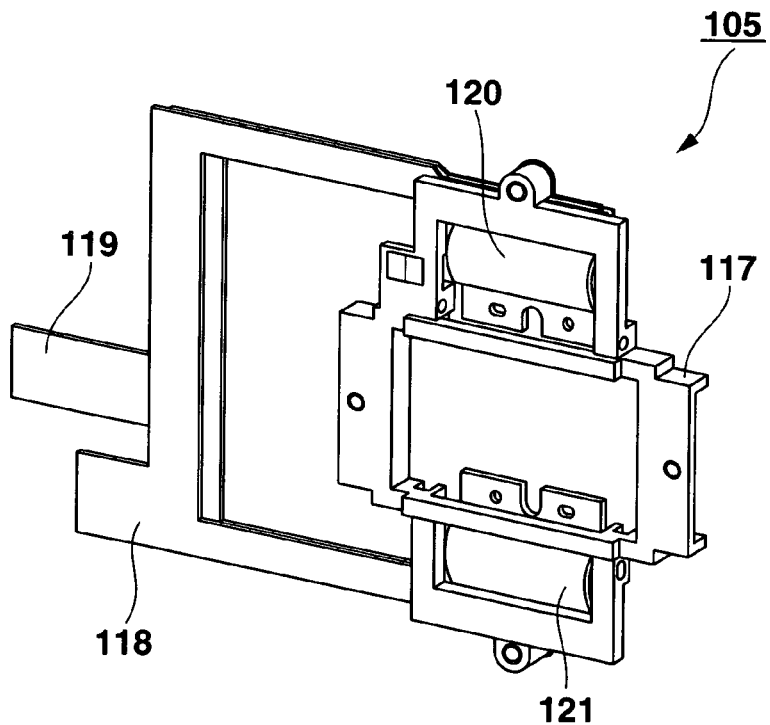
FIG. 20B is a perspective view of the X stage unit in the second embodiment, as seen from its rear side.

As shown in FIGS. 20A and 20B, the X stage unit 105 comprises an X stage 117, actuators 120, 121, FPCs 118, 119 for supplying voltages to the actuators 120, 121 from a circuitry (not shown) to drive the same, holding member 122a for holding the actuator 120, holding member 122b for holding the actuator 121, and a magnet 123 used for detecting a displacement in the X-axis direction, wherein the actuators 120, 121 moves the Y stage unit 107 to displace CCD 3 in the Y-axis direction.

FPCs 118, 119 and holding members 122a, 122b are fixed to the X stage 117 by means of screws.

Meanwhile, a part of FPC 118 and a part of FPC 119 sandwich in one end of the actuator 120 therebetween, and further are held between the holding member 122a and the X stage 117, whereby the actuator 120 is secured to the X stage 117 with the FPC 118 sandwiched in therebetween.

Further, a part of FPC 118 and a part of FPC 119 sandwich in one end of the actuator 121 therebetween, and further are held between the holding member 122b and the X stage 117, whereby the actuator 121 is secured to the X stage 117 with the FPC 118 sandwiched in therebetween.

The magnet 123 is magnetized in the X-axis direction.

FPC 118 electrically contacts separately with the front surface (surface in the same side as CCD 3) of the actuator 120 and the front surface (surface in the side opposite to CCD 3) of the actuator 121.

When the circuitry (not shown) applies voltages to FPC 118, an electric potential at the front surface of the actuator 120 and an electric potential at the front surface of the actuator 121 are controlled separately.

FPC 119 electrically contacts separately with the rear surface (surface in the side opposite to CCD 3) of the actuator 120 and the rear surface (surface in the side opposite to CCD 3) of the actuator 121.

When the circuitry (not shown) applies voltages to FPC 119, an electric potential at the rear surface of the actuator 120 and an electric potential at the rear surface of the actuator 121 are controlled separately.

Figure 21A:
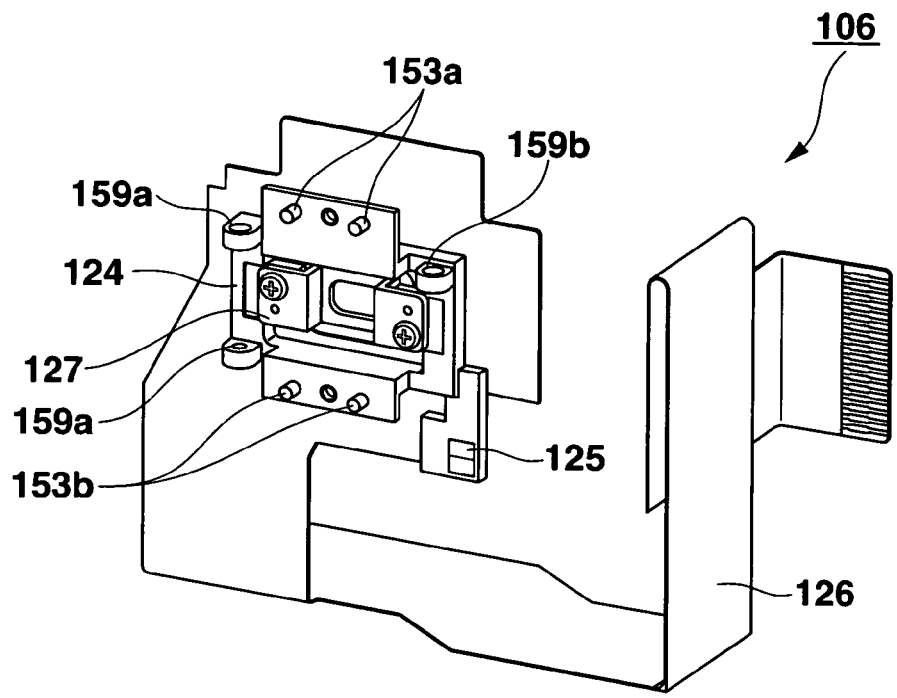
FIG. 21A is a perspective view of a Y stage unit in the second embodiment, as seen from its front side.
Figure 21B:
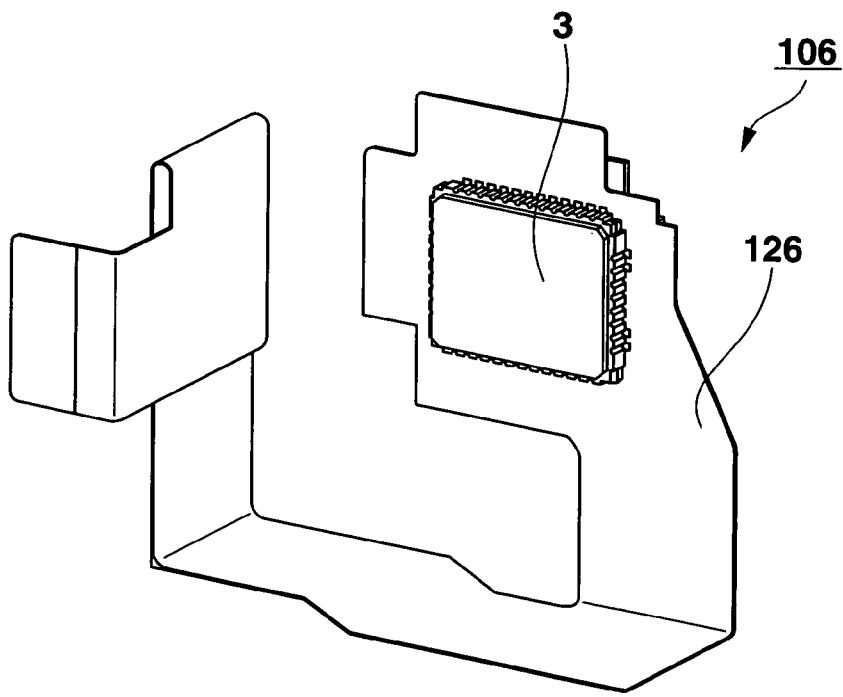
FIG. 21B is a perspective view of the Y stage unit in the second embodiment, as seen from its rear side.

The Y stage unit 106 comprises a Y stage 124, magnet 125 used to detect a displacement in the Y-axis direction, CCD 3, FPC 126 for electrically connecting CCD 3 with a main circuitry, and a CCD holder 127, as shown in FIGS. 21A and 21B.

The magnet is magnetized in the Y-axis direction.

CCD 3 is mounted on FPC 126 to be connected therewith.

Further, the CCD holder 127 adheres to a rear surface of CCD 3 or to the surface opposite to the surface of FPC 126, where CCD 3 is mounted.

The CCD holder 127 is fixed on the Y stage 124 by means of screws.

In other words, CCD 3 is fixed on the Y stage 124 with the CCD holder 127 held therebetween.

In the CCD stage unit 102, projections 151a, 151a provided on the X stage unit 105 (FIG. 20A) and holes 150a, 150a formed in the actuator 110 of the base unit 104 (FIG. 19A) are engaged with each other, and projections 151b, 151b provided on the X stage unit 105 (FIG. 20A) and holes 150b, 150b formed in the actuator 111 of the base unit 104 (FIG. 19A) are engaged with each other, whereby the base unit 104 and X stage unit 105 are mechanically combined.

The holes 150a, 150a are formed in one end portion of the actuator 110, and meanwhile the other end portion thereof is fixed to the base plate 107.

The holes 150b, 150b are formed in one end portion of the actuator 111, and meanwhile the other end portion thereof is fixed to the base plate 107.

In other words, the base unit 104 and X stage unit 105 are mechanically connected with each other by means of the actuators 110, 111.

Each engaging portion is secured by means of the holding member 132a or the holding member 132b, as shown in FIG. 18B.

Further, projections 153a, 153a provided on the Y stage unit 106 (FIG. 21A) and holes 152a, 152a formed in the actuator 120 of the X stage unit 105 (FIG. 19A) are engaged with each other, and projections 153b, 153b provided on the Y stage unit 106 (FIG. 21A) and holes 152b, 152b formed in the actuator 121 of the X stage unit 105 (FIG. 19A) are engaged with each other, whereby the X stage unit 105 and Y stage unit 106 are mechanically combined.

The holes 152a, 150a are formed in one end portion of the actuator 120, and meanwhile the other end portion thereof is fixed to the X stage unit 117.

The holes 152b, 152b are formed in one end portion of the actuator 121, and meanwhile the other end portion thereof is fixed to the X stage unit 117.

In short, the X stage unit 105 and Y stage unit 105 are mechanically connected with each other by means of the actuators 120, 121.

Each engaging portion is secured by means of the holding member 132c or the holding member 132d, as shown in FIG. 18B.

In the CCD stage unit 102, the X stage unit 105 is constructed to slidably move in the X-axis direction with respect to the base unite 104, as shown in FIGS. 18A and 18B.

In short, the X stage unit 105 is constructed to move reciprocally along guide shafts, 128, 129 with respect to the base unit 104.

Further, the Y stage unit 106 is constructed to slidably move in the Y-axis direction with respect to the X stage unite 105.

In short, the Y stage unit 106 is constructed to move reciprocally along guide shafts, 130, 131 with respect to the X stage unit 105.

As described, CCD 3 is adapted to move both in the X-axis direction and in the Y-axis direction, with respect to the base unit 104.

The guide shaft 130 is received in shaft holding portions 158a, 158a formed in the X stage unit 105 (FIG. 20A) and secured by shaft holding portions 159a, 159a provided on the Y stage unit 106 (FIG. 21A).

The guide shaft 131 is received in shaft holding portions 158b, 158b formed in the X stage unit 105 (FIG. 20A) and secured by shaft holding portions 159b, 159b provided on the Y stage unit 106 (FIG. 21A).

The guide shaft 128 is received in shaft holding portions 148a, 148a formed in the base unit 104 (FIG. 19A) and secured by shaft holding portions 149a, 149a provided on the X stage unit 105 (FIG. 20A).

The guide shaft 129 is received in shaft holding portions 148b; 148b formed in the base unit 104 (FIG. 19A) and secured by shaft holding portions 149b, 149b provided on the X stage unit 105 (FIG. 20A).

In the above description, for convenience, the actuator 110 and actuator 111 are described as structural components of the base unit 104, and the actuator 120 and actuator 121 are described as structural components of the X stage unit 105.

But the actuator 110 and actuator 111 may be deemed as structural components of the X stage unit 105, and/or either of them may be deemed as a structural component of the X stage unit 105.

Further, the actuator 120 and actuator 121 may be deemed as structural components of the Y stage unit 106, and/or either of them may be deemed as a structural component of the Y stage unit 106.

Now, movement of the X stage unit 105 will be described. When camera shake has been detected, the X stage unit 105 is moved as described below.

Hereinafter, "movement of the X stage unit 105" means "movement of CCD 3 in the X-axis direction (horizontal direction)".

Figure 22A:
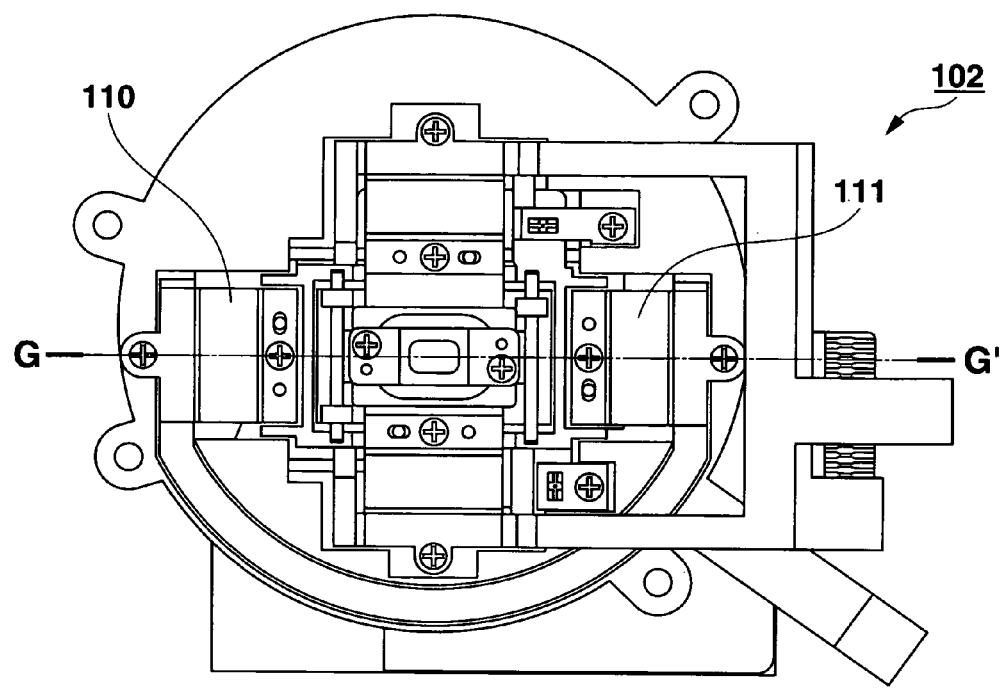
FIG. 22A is a rear view of a CCD stage unit in the second embodiment, which stays at a base position.
Figure 22B:
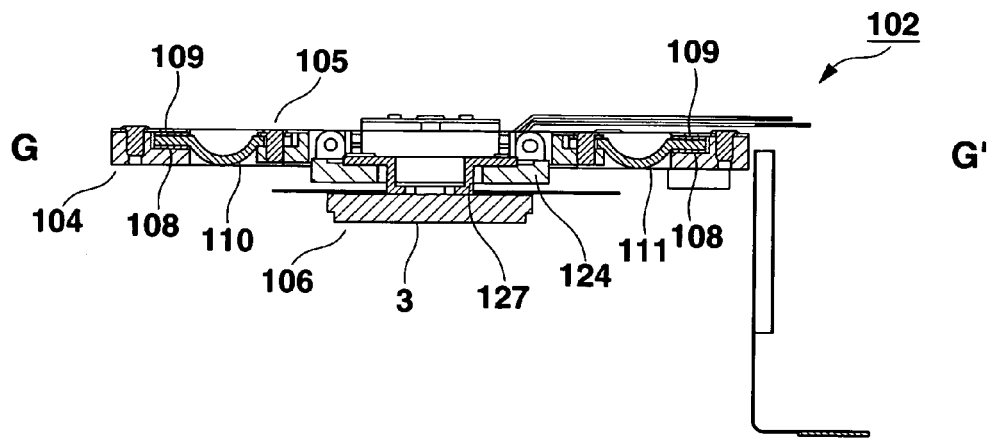
FIG. 22B is a cross sectional view of the CCD stage unit in the second embodiment, which stays at the base position.

While CCD 3 stays at a central position of a plate of the base unit 104, that is, at a base position, the actuator 110 and actuator 111, each connected between the X stage unit 105 and the base unit 104, bend beneath in the substantially same shape, as seen in the drawing, that is, each actuator bends to form an arch-like shape to keep balance, as seen in FIGS. 22A and 22B.

To move CCD 3 leftward as indicated by an arrow L from the position shown in FIGS. 22A and 22B, a voltage is applied to the actuator 110 through FPCs 108 and 109 such that the rear surface (surface in the side opposite to CCD 3) of the actuator 110 is kept at a positive electric potential and the front surface (surface in the same side as CCD 3) thereof is kept at a negative electric potential.

Then, the rear surface of the actuator 110, which is kept at a positive electric potential, decreases in length and the front surface thereof, which is kept at negative electric potential, increases in length, whereby the actuator 110 bends more sharply or bends to form an arch-like shape of a larger curvature.

Figure 23A:
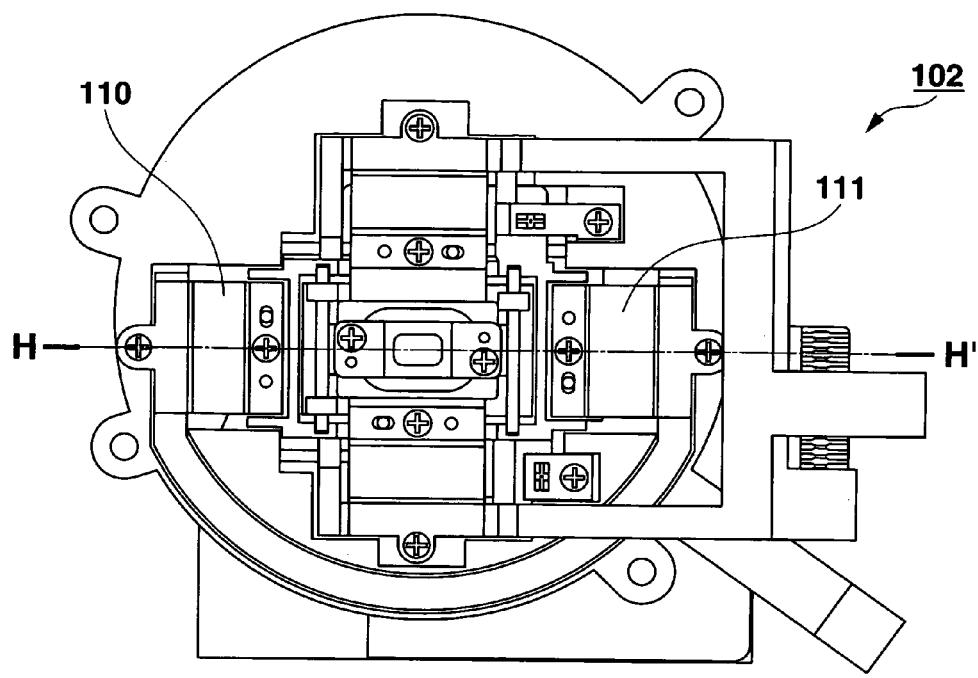
FIG. 23A is a rear view of the CCD stage unit in the second embodiment, which has moved leftward, as seen in the drawing.
Figure 23B:
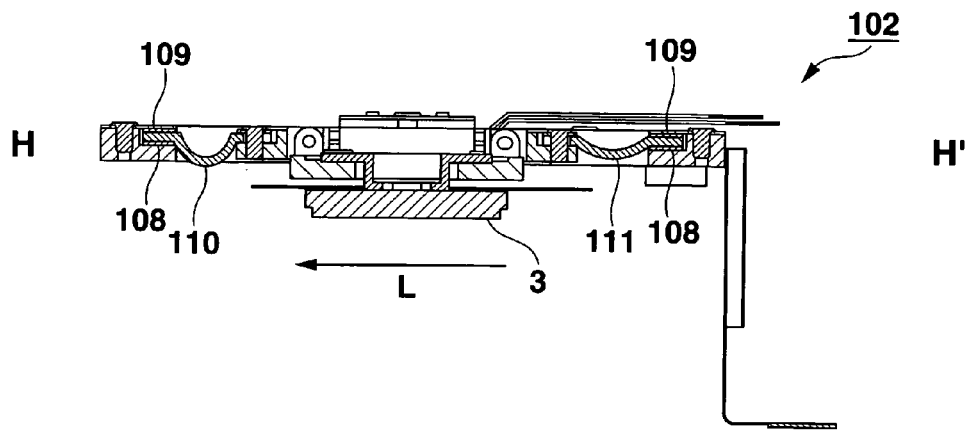
FIG. 23B is a cross sectional view of the CCD stage unit in the second embodiment, which has moved leftward as indicated by an arrow L.

As a result, X stage unit 105 is pulled leftward as seen in the drawing (as indicated by the arrow L in FIG. 23B) by the actuator 110, whereby CCD 3 is carried leftward by the X stage unit 105.

Further, at the same time, a voltage is applied to the actuator 111 through FPCs 108 and 109 such that the rear surface (surface in the side opposite to CCD 3) of the actuator 111 is kept at a negative electric potential and the front surface (surface in the same side as CCD 3) thereof is kept at a positive electric potential.

Then, the rear surface of the actuator 111, which is kept at a negative electric potential, increases in length and the front surface thereof, which is kept at a positive electric potential, decreases in length, whereby the actuator 111 bends less sharply or bends to form an arch-like shape of a less curvature.

As a result, X stage unit 105 is pushed leftward as seen in the drawing (as indicated by the arrow L in FIG. 23B) by the actuator 111, whereby CCD 3 is carried leftward by the X stage unit 105.

The actuator 110 and actuator 111, which are disposed at both sides of CCD 3 in the X-axis direction, change their arch-like shapes at different curvatures in an opposite manner, thereby moving CCD 3 leftward as indicated by the arrow L.

Meanwhile, to move CCD 3 rightward from the position shown in FIGS. 22A and 22B, as indicated by an arrow R, a voltage is applied to the actuator 110 through FPCs 108 and 109 such that the rear surface (surface in the side opposite to CCD 3) of the actuator 110 is kept at a negative electric potential and the front surface (surface in the same side as CCD 3) thereof is kept at a positive electric potential.

Figure 24A:
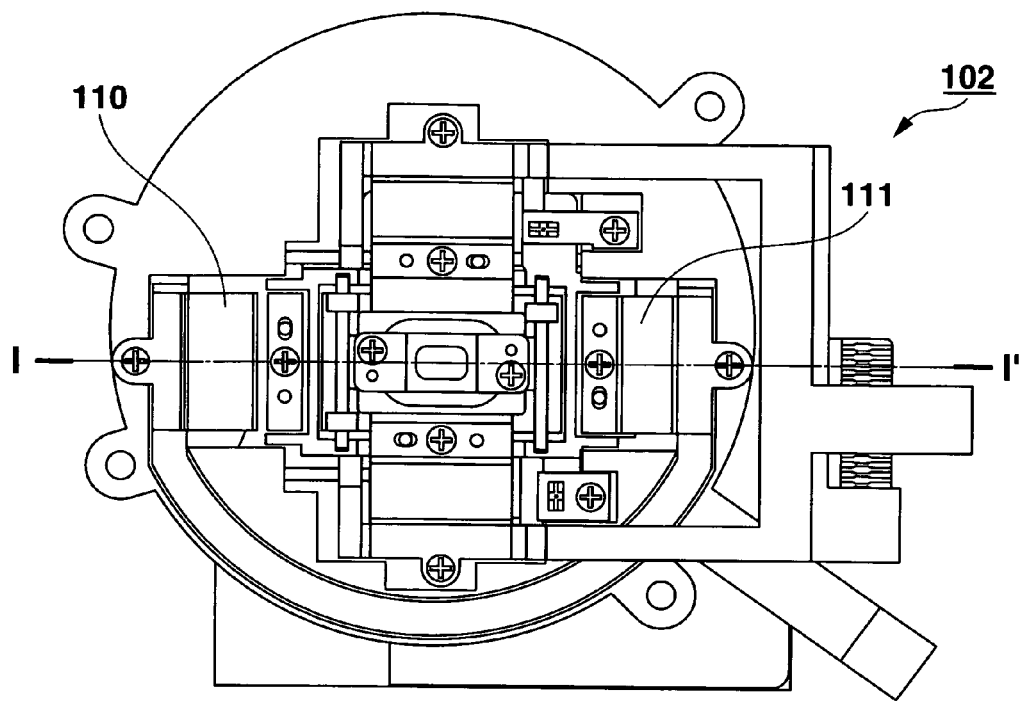
FIG. 24A is a rear view of the CCD stage unit in the second embodiment, which has moved rightward as seen in the drawing.
Figure 24B:
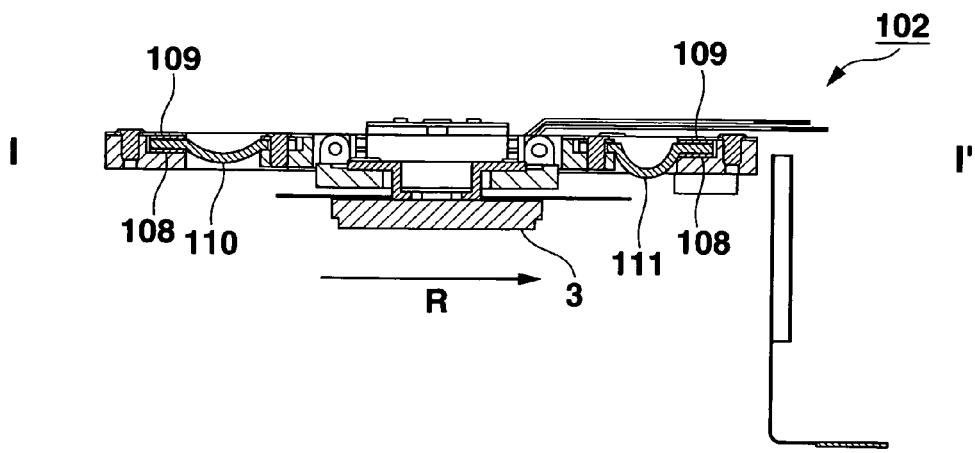
FIG. 24B is a cross sectional view of the CCD stage unit in the second embodiment, which has moved rightward as indicated by an arrow R.

Then, the rear surface of the actuator 110, which is kept at negative electric potential, increases in length and the front surface thereof, which is kept at positive electric potential, decreases in length, whereby the actuator 110 changes in shape to form an arch-like shape of a less curvature as shown in FIGS. 24A and 24B.

As a result, X stage unit 105 is pushed rightward as seen in the drawing (shown by the arrow R in FIG. 24B) by the actuator 110, whereby CCD 3 is carried rightward by the X stage unit 105.

Further, at the same time, a voltage is applied to the actuator 111 through FPCs 108 and 109 such that the rear surface (surface in the side opposite to CCD 3) of the actuator 111 is kept at a positive electric potential and the front surface (surface in the same side as CCD 3) thereof is kept at a negative electric potential.

Then, the rear surface of the actuator 111, which is kept at a positive electric potential, decreases in length and the front surface thereof, which is kept at a negative electric potential, increases in length, whereby the actuator 111 bends more sharply or bends to form an arch-like shape of a larger curvature.

As a result, X stage unit 105 is pulled rightward as seen in the drawing (shown by the arrow R in FIG. 24B) by the actuator 111, whereby CCD 3 is carried rightward by the X stage unit 105.

The actuator 110 and actuator 111, which are disposed at the both sides of CCD 3 in the X-axis direction, change their arch-like shapes at different curvatures in an opposite manner, thereby moving CCD 3 rightward as indicated by the arrow R.

Now, movement of the Y stage unit 106 will be described. When camera shake has been detected, the Y stage unit 106 is moved as described below.

Hereinafter, "movement of the Y stage unit 106" means "movement of CCD 3 in the Y-axis direction (vertical direction)".

Figure 25B:
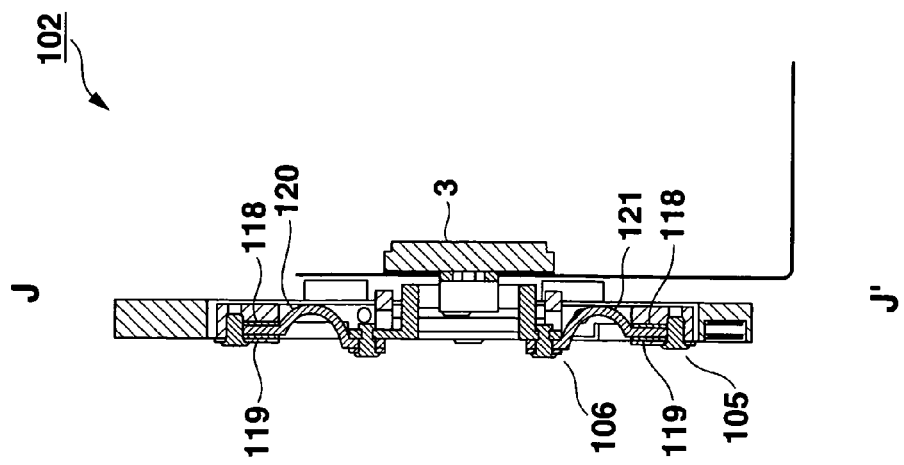
FIG. 25B is a cross sectional view of the CCD stage unit in the second embodiment, which stays at the base position.
Figure 25A:
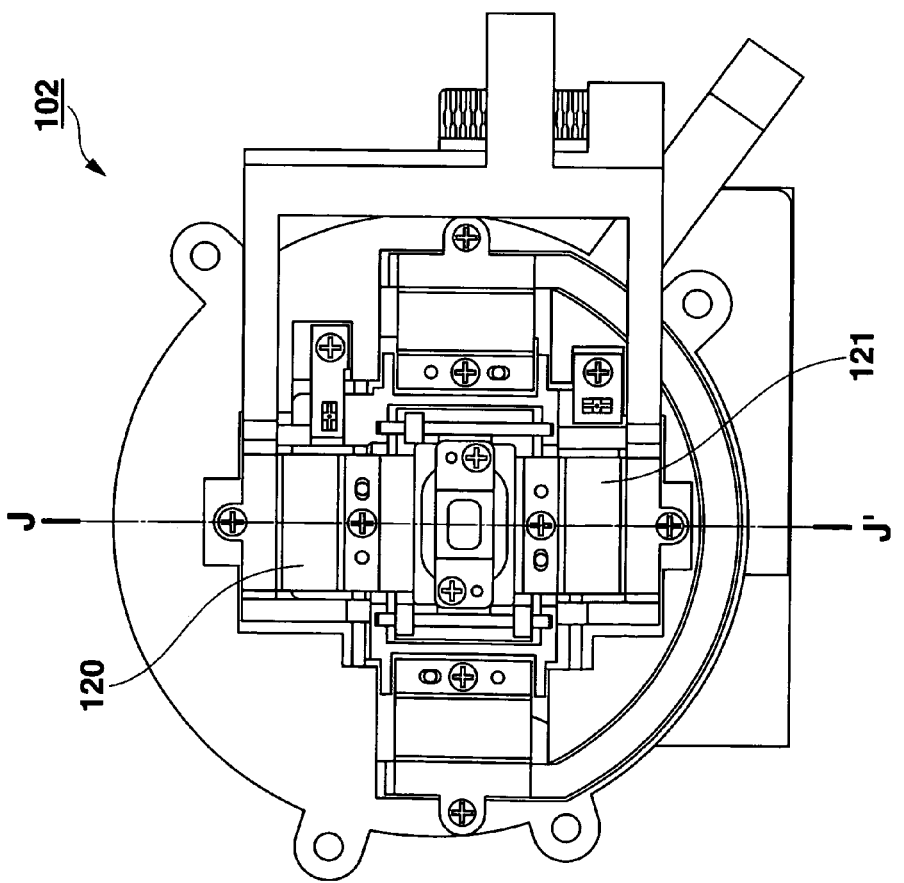
FIG. 25A is a rear view of the CCD stage unit in the second embodiment, which stays at a base position.

While CCD 3 stays at the central position of the plate of the base unit 104, that is, stays at the base position, the actuator 120 and actuator 121, each connecting the X stage unit 105 with the base unit 104, bend to form substantially same arch-like shapes to keep balance, as shown in FIGS. 25A and 25B.

To move CCD 3 upward from the base position shown in FIGS. 25A and 25B, as indicated by an arrow U in FIG. 26B, a voltage is applied to the actuator 120 from FPCs 118 and 119 such that the rear surface (surface in the side opposite to CCD 3) of the actuator 120 is kept at a positive electric potential and the front surface (surface in the same side as CCD 3) thereof is kept at a negative electric potential.

Then, the rear surface of the actuator 120, which is kept at a positive electric potential, decreases in length and the front surface thereof, which is kept at negative electric potential, increases in length, whereby the actuator 120 bends more sharply or bends to form an arch-like shape of a larger curvature.

As a result, the Y stage unit 106 is pulled upward as seen in the drawing (shown by the arrow U in FIG. 26B) by the actuator 120, whereby CCD 3 is carried upward by the Y stage unit 106.

Further, at the same time, a voltage is applied to the actuator 121 through FPCs 118 and 119 such that the rear surface (surface in the side opposite to CCD 3) of the actuator 121 is kept at a negative electric potential and the front surface (surface in the same side as CCD 3) thereof is kept at a positive electric potential.

Then, the rear surface of the actuator 121, which is kept at a negative electric potential, increases in length and the front surface thereof, which is kept at a positive electric potential, decreases in length, whereby the actuator 121 bends to form an arch-like shape of a less curvature.

As a result, the Y stage unit 106 is pushed upward as seen in the drawing (as indicated by the arrow U in FIG. 26B) by the actuator 121, whereby CCD 3 is carried upward by the Y stage unit 106.

The actuator 120 and actuator 121, which are disposed at the both sides of CCD 3 and in the Y-axis direction, change their arch-like shapes at different curvatures in an opposite manner, thereby moving CCD 3 upward as indicated by the arrow U in FIG. 26B.

Meanwhile, to move CCD 3 downward as indicated by an arrow D in FIG. 27B from the position shown in FIGS. 25A and 25B, a voltage is applied to the actuator 120 through FPCs 118 and 119 such that the rear surface (surface in the side opposite to CCD 3) of the actuator 120 is kept at a negative electric potential and the front surface (surface in the same side as CCD 3) thereof is kept at a positive electric potential.

Then, the rear surface of the actuator 120, which is kept at a negative electric potential, increases in length and the front surface thereof, which is kept at a positive electric potential, decreases in length, whereby the actuator 120 changes in shape to form an arch-like shape of a less curvature as shown in FIGS. 27A and 27B.

As a result, the Y stage unit 106 is pushed downward as seen in the drawing (as indicated by the arrow D in FIG. 27B) by the actuator 120, whereby CCD 3 is carried downward by the Y stage unit 106.

Further, at the same time, a voltage is applied to the actuator 121 through FPCs 118 and 119 such that the rear surface (surface in the side opposite to CCD 3) of the actuator 121 is kept at a positive electric potential and the front surface (surface in the same side as CCD 3) thereof is kept at a negative electric potential.

Then, the rear surface of the actuator 121, which is kept at a positive electric potential, decreases in length and the front surface thereof, which is kept at negative electric potential, increases in length, whereby the actuator 121 bends more sharply or bends to form an arch-like shape of a larger curvature.

As a result, the Y stage unit 106 is pulled downward as seen in the drawing (as indicated by the arrow D in FIG. 27B) by the actuator 121, whereby CCD 3 is carried downward by the Y stage unit 106.

The actuator 120 and actuator 121, which are disposed at both sides of CCD 3 and in the Y-axis direction, change in shape or bend to form an arch-like shape of a larger curvature or an arch-like shape of a less curvature, thereby moving CCD 3 downward as indicated by the arrow D in FIG. 27B.

As described, the actuators 120, 121 change their arch-like shapes, or bend at different curvatures in response to voltages applied thereto, wherein the voltages correspond to detected camera shake.

Change of the actuators 120, 121 in shape controls movement of the X stage unit 105 and Y stage unit 106, that is, controls movement of CCD 3 with respect to the base unit 104.

Camera shake in the X-axis direction or in the horizontal direction is detected based on change in the magnetic field of the magnet 123 sensed by the hole sensor 113 mounted on the base unit 104.

Meanwhile, camera shake in the Y-axis direction or in the vertical direction is detected based on change in the magnetic field of the magnet 125 sensed by the hole sensor 115 mounted on the base unit 104.

As described above, since the actuators (elastic driving elements) of a film type are used in the embodiment of the apparatus for correcting camera shake, which change in shape when voltages are applied to the actuators, hand shake can be corrected with no backrush and without any noises such as driving sounds and gear sounds, and further the actuators used in the embodiment generate no heat differently from a voice-coil motor.

Third Embodiment

Now, the third embodiment of the apparatus for correcting camera shake according to the present invention will be described in detail.

In the third embodiment, like reference numerals represent like elements of the first and second embodiments and a further description thereof will be omitted.

Figure 28A:
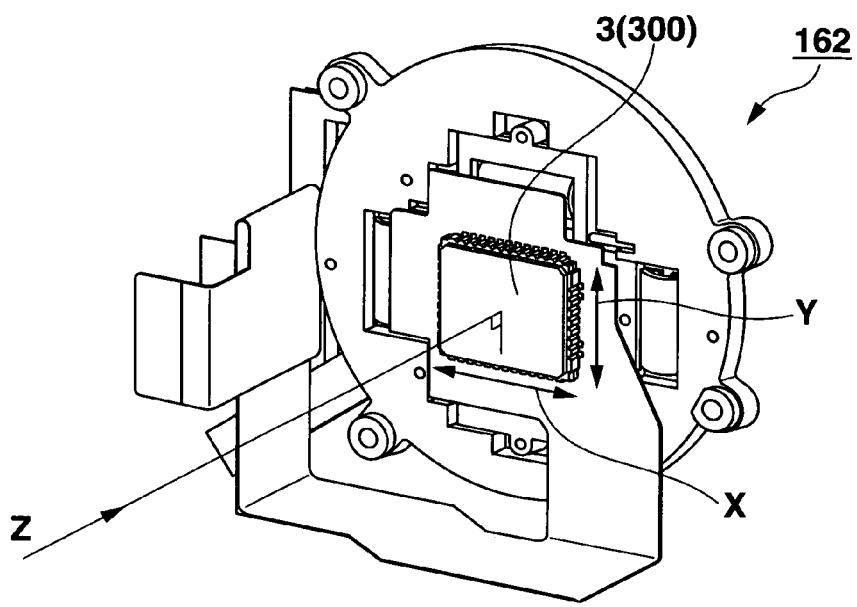
FIG. 28A is a perspective view of a CCD stage unit in the third embodiment, as seen from its front side.
Figure 28B:
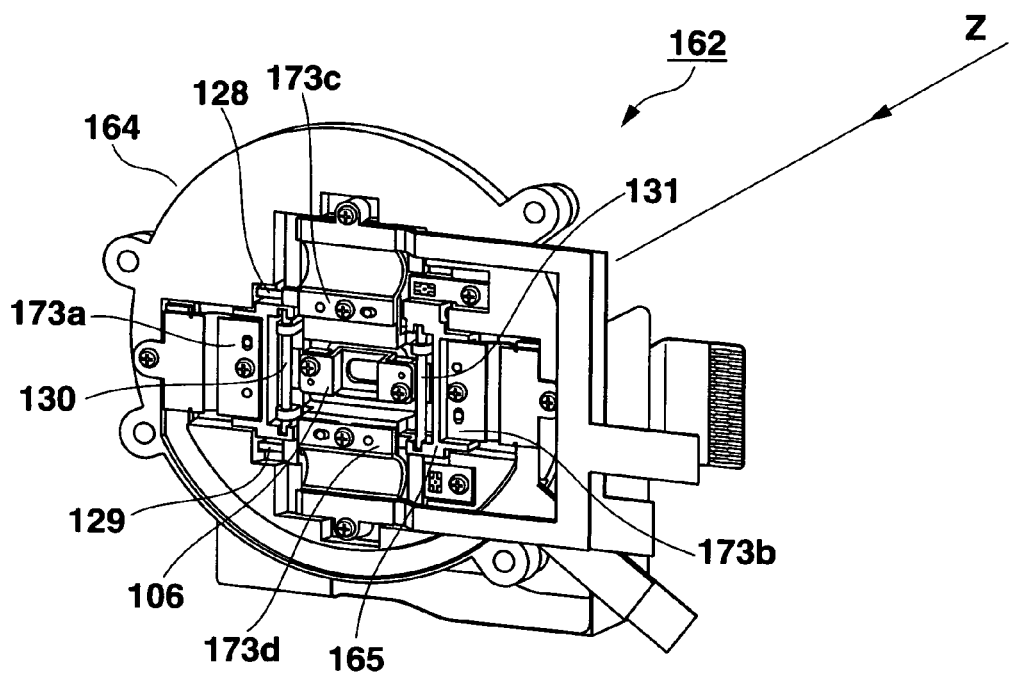
FIG. 28B is a perspective view of the CCD stage unit in the third embodiment, as seen from its rear side.

FIGS. 28A and 28B are views showing CCD stage unit 162 in the third embodiment.

FIG. 28A is a perspective view showing the CCD stage unit 162 as viewed from the front side thereof. FIG. 28B is a perspective view showing the CCD stage unit 162 as viewed from the rear side thereof.

The CCD stage unit 162 comprises a base unit 164, X stage unit 165 for carrying CCD 3 in the X-axis direction, and Y stage unit 106 for carrying CCD 3 in the Y-axis direction.

Figure 29A:
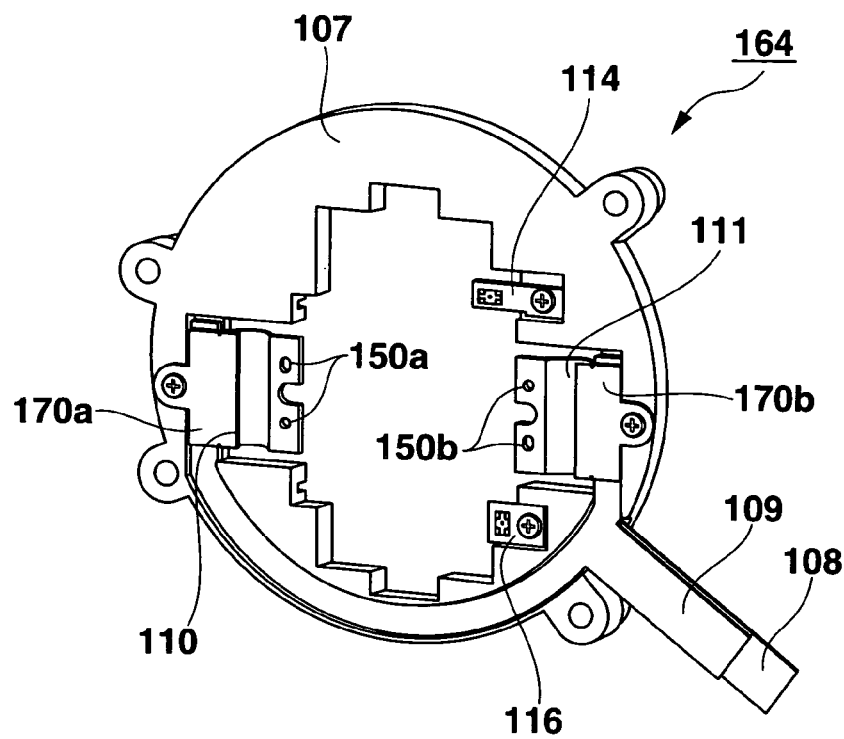
FIG. 29A is a perspective view of a base unit in the third embodiment, as seen from its front side.
Figure 29B:
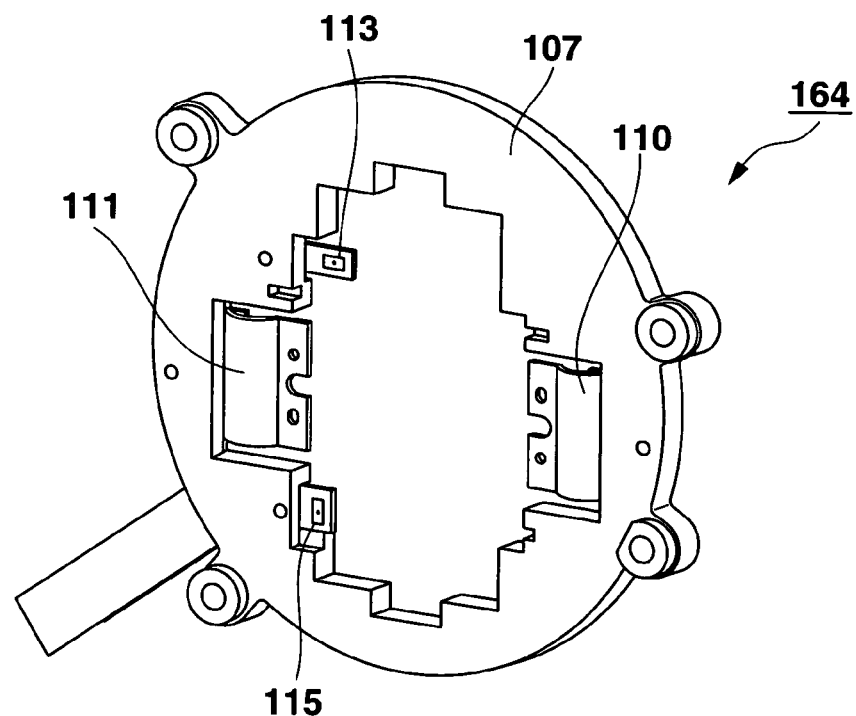
FIG. 29B is a perspective view of the base unit in the third embodiment, as seen from its rear side.

As shown in FIGS. 29A and 29B, the base unit 164 comprises a base plate 107, X stage unit 165, Y stage unit 106, actuators 110, 111, FPCs 108, 109 for applying voltages to the actuators 110, 111 from a circuitry (not shown) to drive the same, holding members 170a, 170b extending toward the actuators 110, 111 to hold FPCs 108, 109, and actuators 110, 111, hole sensor 113 for detecting a displacement in the X-axis direction, substrate 114, on which the hole sensor 113 is mounted, hole sensor 115 for detecting a displacement in the Y-axis direction, and substrate 116, on which the hole sensor 115 is mounted, wherein the actuators 110 and 111 move the X stage unit 165 and the Y stage unit 106 to carry CCD 3 in the X-axis direction.

FPCs 108, 109, holding members 170a, 170b and the substrates 114, 116 are fixed on the base plate 107 by means of screws.

Meanwhile, a part of FPC 108 and a part of FPC 109 sandwich in one end of the actuator 110 therebetween, and further the FPCs 108, 109 are held between the holding member 170a and the base plate 107, whereby the actuator 110 is secured to the base plate 107 with the FPC 108 sandwiched in therebetween.

Further, a part of FPC 108 and a part of FPC 109 sandwich in one end of the actuator 111 therebetween, and further said parts of the FPCs 108, 109 are held between the holding member 170b and the base plate 107, whereby the actuator 111 is secured to the base plate 107 with the FPC 108 sandwiched in therebetween.

Figure 30A:
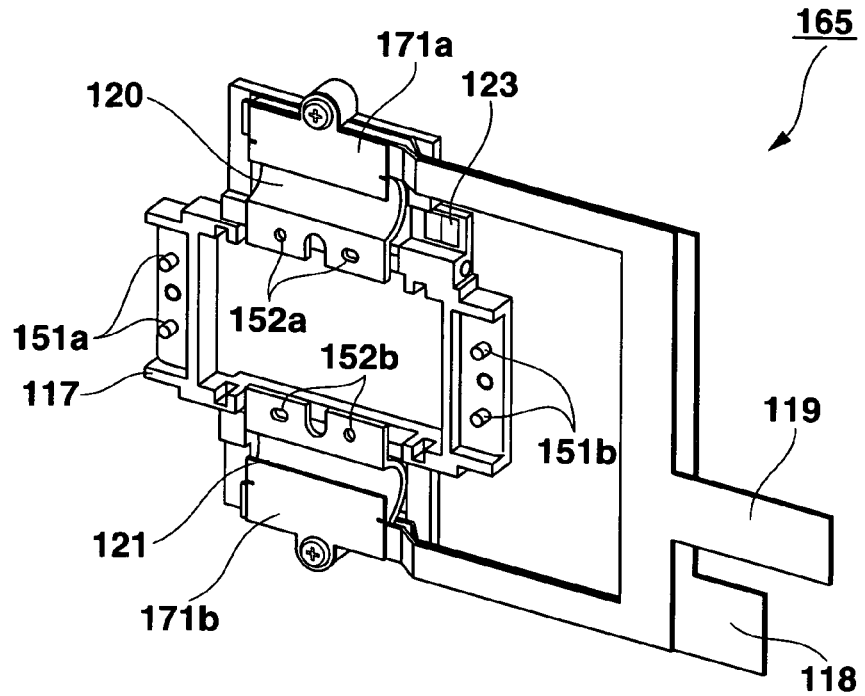
FIG. 30A is a perspective view of an X stage unit in the third embodiment, as seen from its front side.
Figure 30B:
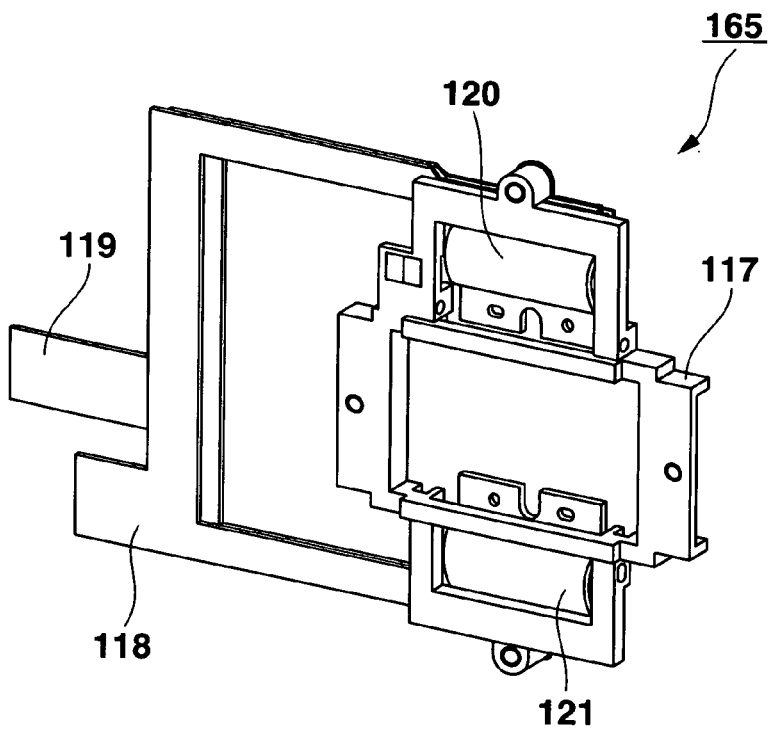
FIG. 30B is a perspective view of the X stage unit in the third embodiment, as seen from its rear side.

As shown in FIGS. 30A and 30B, the X stage unit 165 comprises X stage 117, actuators 120, 121, FPCs 118, 119, holding member 171a extending toward the actuator 120 to hold the same, holding member 171b extending toward the actuator 121 to hold the same, an a magnet 123 used for detecting a displacement in the X-axis direction, wherein the actuators 120, 121 moves the Y stage unit 107 to carry CCD 3 in the Y-axis direction, and FPCs 118, 119 supply voltages to the actuators 120, 121 from a circuitry (not shown) to drive the same.

FPCs 118, 119, and holding members 171a, 171b are fixed on the X stage 117 by means of screws.

A part of FPC 118 and a part of FPC 119 sandwich in one end of the actuator 120 therebetween, and further said parts of the FPCs 118, 119 are held between the holding member 171a and the X stage 117, whereby the actuator 120 is secured to the X stage 117 with the FPC 118 sandwiched in therebetween.

Further, a part of FPC 118 and a part of FPC 119 sandwich in one end of the actuator 121 therebetween, and further said parts of the FPCs 118, 119 are held between the holding member 171b and the X stage 117, whereby the actuator 121 is secured to the X stage 117 with the FPC 118 sandwiched in therebetween.

The magnet 123 is magnetized in the X-axis direction.

In the CCD stage unit 162, projections 151a, 151a provided on the X stage 117 of the X stage unit 165 (FIG. 30A) and holes 150a, 150a formed in the actuator 110 of the base unit 164 (FIG. 29A) are engaged with each other, and projections 151b, 151b provided on the X stage 117 of the X stage unit 165 (FIG. 30A) and holes 150b, 150b formed in the actuator 111 of the base unit 164 (FIG. 19A) are engaged with each other, whereby the base unit 164 and X stage unit 165 are mechanically combined.

The holes 150a, 150a are formed in one end portion of the actuator 110, and meanwhile the other end portion thereof is fixed to the base plate 107.

The holes 150b, 150b are formed in one end portion of the actuator 111, and meanwhile the other end portion thereof is fixed to the base plate 107.

In other words, the X stage unit 105 and Y stage unit 106 are mechanically connected with each other by means of the actuators 120, 121.

Each engaging portion is secured by means of the holding member 173a or the holding member 173b.

In short, the base unit 164 and the X stage unit 165 are mechanically connected with each other by means of the actuators 110, 111.

Each engaging portion is secured by means of the holding member 173a or the holding member 173b extending toward the appropriate actuators.

The projections 153a, 153a provided on the Y stage unit 165 (FIG. 30A) and holes 152a, 152a formed in the actuator 120 of the X stage unit 164 (FIG. 29A) are engaged with each other, and projections 153b, 153b provided on the Y stage unit 106 (FIG. 21A) and holes 152b, 152b formed in the actuator 121 of the X stage unit 165 (FIG. 30A) are engaged with each other, whereby the X stage unit 165 and Y stage unit 106 are mechanically combined.

The holes 152a, 152a are formed in one end portion of the actuator 120, and meanwhile the other end portion thereof is fixed to the X stage 117.

The holes 152b, 152b are formed in one end portion of the actuator 121, and meanwhile the other end portion thereof is fixed to the X stage 117.

In other words, the X stage unit 165 and Y stage unit 106 are mechanically connected with each other by means of the actuators 120, 121.

Each engaging portion is secured by means of the holding member 173c or the holding member 173d.

In the above arrangement, the concave surface of the actuator is forcibly pressed with a flat surface of the holding member.

Figure 31A:
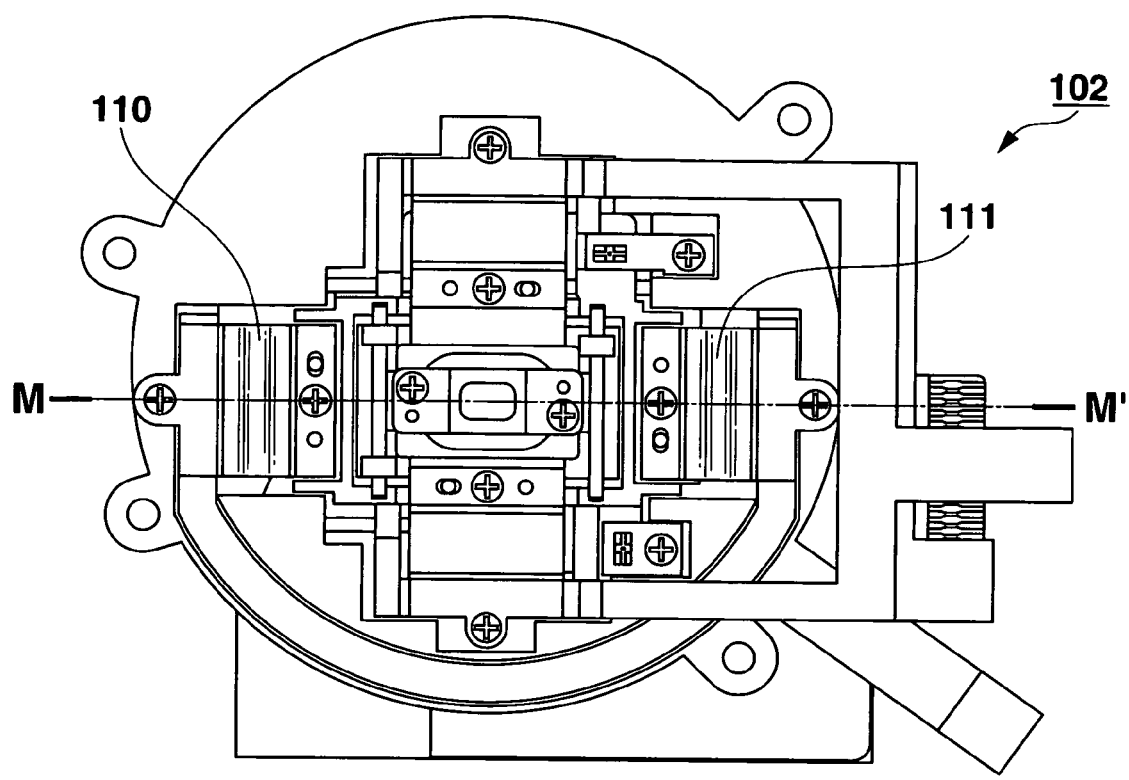
FIG. 31A is a rear view of CCD stage unit in the third embodiment, wherein actuators bend multiply.
Figure 31B:
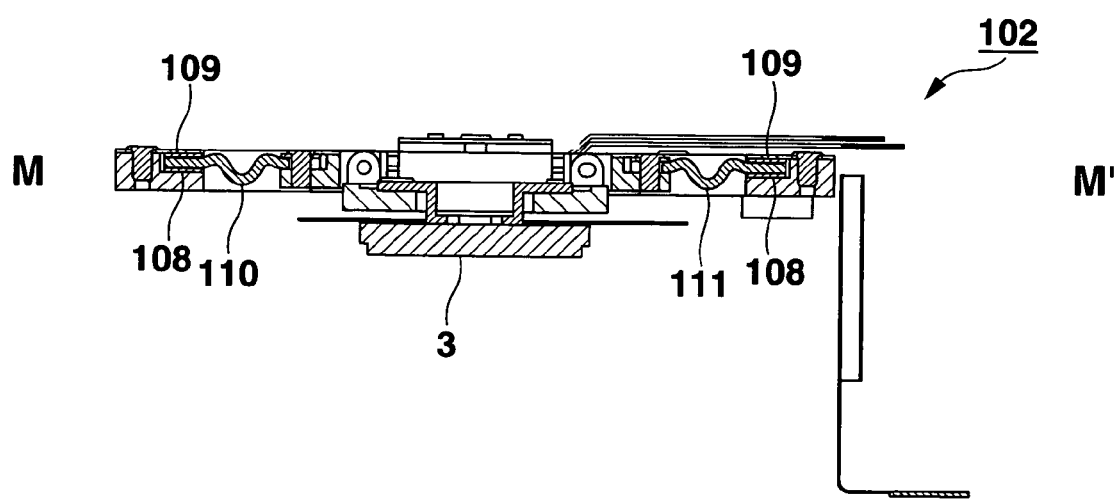
FIG. 31B is a cross sectional view of CCD stage unit in the third embodiment as seen from its rear side, wherein actuators bend multiply.
Figure 32A:
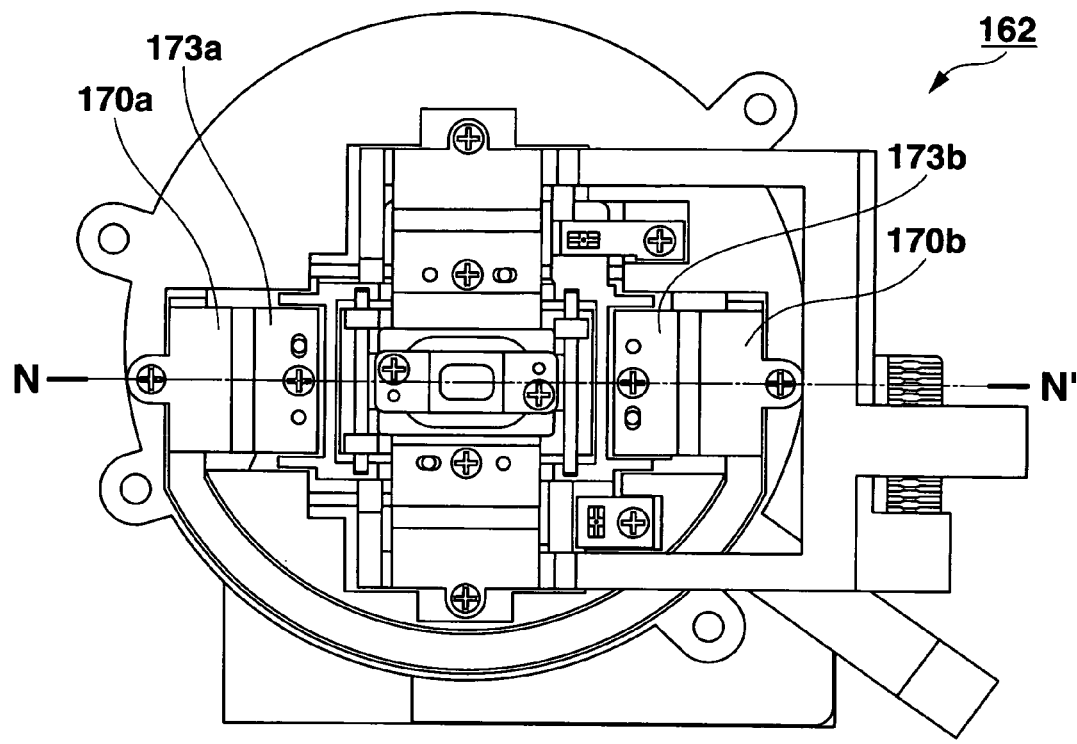
FIG. 32A is a rear view of CCD stage unit in the third embodiment, wherein actuators each bend to form an ideal arch-like shape.
Figure 32B:
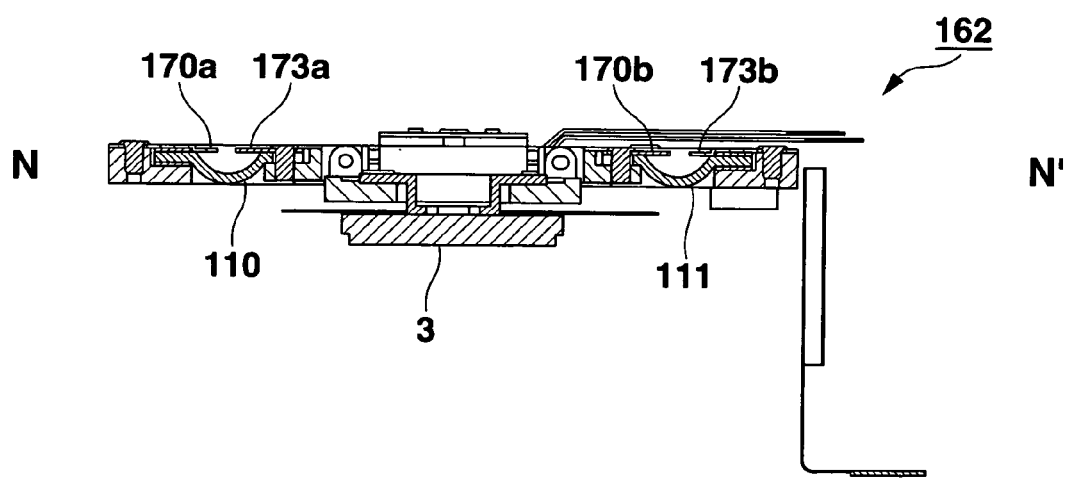
FIG. 32B is a cross sectional view of CCD stage unit in the third embodiment, as seen from the rear side, wherein actuators each bend to form an ideal arch-like shape.

In other words, an actuator having strong elastic force can bend multiply in the vicinity of its fixed portion, as shown in FIGS. 31A, 31B, but in the above arrangement employed in the present embodiment, each holding member extends toward the appropriate actuator to prevent the actuator from bending multiply. Therefore, the actuators 110, 111, 120 and 121 are allowed to keep an ideal arch-like shape.

In the above embodiments, a pair of actuators are prepared for movement in the X-axis direction and another pair of actuators are prepared for movement in the Y-axis direction, but a single actuator may be used in place of the pair of actuators. The actuator are fixed by means of screws but may be secured by springs.

Further, in the embodiment described above, CCD 3 is arranged to move relatively to the lens unit 1 or the optical lens, but modification may be made that the optical lens is moved relatively to CCD 3. That is, an actuator made of elastic member may be preferable for moving an image capturing element or optical lens, but such elastic member is not limited to a member of an Ionic Polymer-Metal Composite film (IPMC film).

CCD is used as the image capturing element, but CMOS may be used as the image capturing element.

The apparatus for correcting camera shake or the image capturing apparatus according to the present invention may be applied not only to digital cameras but also to cellular phones, personal digital assistants, and digital video cameras.

What is claimed is:

1. An apparatus for correcting camera shake, used in a camera which includes an optical unit and an image capturing element having an image capturing plane, the apparatus comprising:
    a holding unit for holding the image capturing element;
    a driving unit connected between the holding unit and the optical unit of the camera, wherein the driving unit changes in shape when a voltage is applied across a front surface and rear surface thereof;
    a detecting unit for detecting camera shake of the camera; and
    a voltage applying unit for applying voltage to the driving unit in response to a detection by the detecting unit to move the holding unit, thereby displacing the image capturing element such that an optical axis of the optical unit passes through a center of the image capturing plane of the image capturing element;
    wherein the driving unit comprises:
        a first driving member, which changes in shape with an imaginary plane at a center of a range of change to increase or decrease in length in a first direction, in response to a voltage applied across a front surface and rear surface of the first driving member, wherein the imaginary plane includes the image capturing plane of the image capturing element; and
        a second driving member, which changes in shape with the imaginary plane at the center of a range of change to increase or decrease in length in a second direction perpendicular to the first direction, in response to a voltage applied across a front surface and rear surface of the second driving member, and
    wherein the voltage applying unit forms a frame for surrounding the image capturing element to keep the image capturing plane thereof at a center of the frame, and has electrodes on the frame for applying a voltage across the front surface and rear surface of the first driving-member and separate electrodes on the frame for applying a voltage across the front surface and rear surface of the second driving member.

2. The apparatus for correcting camera shake according to claim 1, wherein the driving unit comprises an ionic polymer-metal composite film.

3. An apparatus for correcting camera shake, used in a camera which includes an optical unit and an image capturing element having an image capturing plane, the apparatus comprising:
    a holding unit for holding the image capturing element;
    a driving unit connected between the holding unit and the optical unit of the camera, wherein the driving unit changes in shape when a voltage is applied across a front surface and rear surface thereof;
    a detecting unit for detecting camera shake of the camera; and
    a voltage applying unit for applying voltage to the driving unit in response to a detection by the detecting unit to move the holding unit, thereby displacing the image capturing element such that an optical axis of the optical unit passes through a center of the image capturing plane of the image capturing element;
    wherein the driving unit has a substantially arch-shaped curvature, and the curvature is changed when voltage is applied across one end of the front surface and one end of the rear surface, and
    wherein the holding unit comprises a holding member for keeping the driving unit at a side opposite to a side where the driving unit bends.

4. The apparatus for correcting camera shake according to claim 3, wherein at least one of the holding member and the optical unit extends toward the driving unit.

5. An apparatus for correcting camera shake, used in a camera which includes an optical unit and an image capturing element having an image capturing plane, the apparatus comprising:
    a holding unit for holding the image capturing element;
    a driving unit connected between the holding unit and the optical unit of the camera, wherein the driving unit changes in shape when a voltage is applied across a front surface and rear surface thereof;

a detecting unit for detecting camera shake of the camera; and a voltage applying unit for applying voltage to the driving unit in response to a detection by the detecting unit to move the holding unit, thereby displacing the image capturing element such that an optical axis of the optical unit passes through a center of the image capturing plane of the image capturing element;

wherein the voltage applying unit comprises:
a first sheet of flexible printed circuit with electrodes printed on a front surface thereof; and
a second sheet of flexible printed circuit with electrodes printed on a rear surface thereof, and wherein the driving unit is disposed such that the electrodes printed on the flexible printed circuits contact a part of the front surface and a part of the rear surface of the driving unit, respectively, when the first and second sheets of flexible printed circuits are arranged on top of another to sandwich the driving unit therebetween.

6. An apparatus for correcting camera shake, used in a camera which includes an optical unit and an image capturing element having an image capturing plane, the apparatus comprising:

a holding unit for holding the image capturing element;
a driving unit connected between the holding unit and the optical unit of the camera, wherein the driving unit changes in shape when a voltage is applied across a front surface and rear surface thereof;
a detecting unit for detecting camera shake of the camera; and
a voltage applying unit for applying voltage to the driving unit in response to a detection by the detecting unit to move the holding unit, thereby displacing the image capturing element such that an optical axis of the optical unit passes through a center of the image capturing plane of the image capturing element;

wherein the voltage applying unit comprises a sheet of flexible printed circuit with electrodes printed on one surface thereof, and wherein the driving unit is disposed such that the electrodes printed on the flexible printed circuit contact a part of the front surface and a part of the rear surface of the driving unit, respectively, when the flexible printed circuit is folded to sandwich the driving unit therebetween.

7. An image capturing apparatus comprising:
an optical unit including a lens;
an image capturing element having an image capturing plane;
a holding unit for holding the image capturing element;
a driving unit connected between the holding unit and the optical unit, wherein the driving unit changes in shape in response to a voltage applied across a front surface and rear surface thereof;
a detecting element for detecting camera shake; and
a voltage applying unit for applying voltage to the driving unit in response to a detection by the detecting element to move the holding unit, thereby displacing the image capturing element such that an optical axis of the lens of the optical unit passes through a center of the image capturing plane of the image capturing element;

wherein the driving unit comprises:
a first driving member, which changes in shape with an imaginary plane at a center of a range of change to increase or decrease in length in a first direction, in response to a voltage applied across a front surface and rear surface of the first driving member, wherein the imaginary plane includes the image capturing plane of the image capturing element; and
a second driving member, which changes in shape with the imaginary plane at the center of range of change to increase or decrease in length in a second direction perpendicular to the first direction, in response to a voltage applied across a front surface and rear surface of the second driving member, and wherein the voltage applying unit forms a frame for surrounding the image capturing element to keep the image capturing plane of the image capturing element at a center of the frame, and has electrodes on the frame for applying a voltage across the front surface and rear surface of the first driving member and separate electrodes on the frame for applying a voltage across the front surface and rear surface of the second driving member.

8. The image capturing apparatus according to claim 7, wherein the voltage applying unit comprises a sheet of flexible printed circuit with the electrodes printed on one surface thereof, and wherein the driving unit is disposed such that the electrodes printed on the flexible printed circuit contact a part of the front surface and a part of the rear surface of the driving unit, respectively, when the flexible printed circuit is folded to sandwich the driving unit therebetween.

9. The image capturing apparatus according to claim 7, wherein the driving unit comprises an ionic polymer-metal composite film.

10. An image capturing apparatus comprising:
an optical unit including a lens;
an image capturing element having an image capturing plane;
a holding unit for holding the image capturing element;
a driving unit connected between the holding unit and the optical unit, wherein the driving unit changes in shape in response to a voltage applied across a front surface and rear surface thereof;
a detecting element for detecting camera shake; and
a voltage applying unit for applying voltage to the driving unit in response to a detection by the detecting element to move the holding unit, thereby displacing the image capturing element such that an optical axis of the lens of the optical unit passes through a center of the image capturing plane of the image capturing element;

wherein the driving unit has a substantially arch-shaped curvature, and the curvature is changed when voltage is applied across one end of the front surface and one end of the rear surface, and wherein the holding unit comprises a holding member for keeping the driving unit at a side opposite to a side where the driving unit bends.

11. The image capturing apparatus according to claim 10, wherein at least one of the holding member and the optical unit extends toward the driving unit.

12. An image capturing apparatus comprising:
an optical unit including a lens;
an image capturing element having an image capturing plane;
a holding unit for holding the image capturing element;
a driving unit connected between the holding unit and the optical unit, wherein the driving unit changes in shape in response to a voltage applied across a front surface and rear surface thereof;
a detecting element for detecting camera shake; and
a voltage applying unit for applying voltage to the driving unit in response to a detection by the detecting element to move the holding unit, thereby displacing the image capturing element such that an optical axis of the lens of the optical unit passes through a center of the image capturing plane of the image capturing element;

wherein the voltage applying unit comprises a first sheet of flexible printed circuit with electrodes printed on a front surface thereof and a second sheet of flexible printed circuit with electrodes printed on a rear surface thereof, and wherein the driving unit is disposed such that the electrodes printed on the flexible printed circuits contact a part of the front surface and a part of the rear surface of the driving unit, respectively, when the first and second sheets of flexible printed circuits are arranged on top of another to sandwich the driving unit therebetween.

* * * * *

UNITED STATES PATENT AND TRADEMARK OFFICE
CERTIFICATE OF CORRECTION

| | | |
|---|---|---|
| PATENT NO. | : 8,013,897 B2 | Page 1 of 1 |
| APPLICATION NO. | : 12/070290 | |
| DATED | : September 6, 2011 | |
| INVENTOR(S) | : Kenji Nakayama | |

It is certified that error appears in the above-identified patent and that said Letters Patent is hereby corrected as shown below:

On the Title page:

Under Item (75) Inventors;

change "Nakayami" to --Nakayama--.

Signed and Sealed this
Twenty-seventh Day of November, 2012

David J. Kappos
*Director of the United States Patent and Trademark Office*